US012710504B2

(12) United States Patent
Shrestha et al.

(10) Patent No.: US 12,710,504 B2
(45) Date of Patent: Aug. 18, 2026

(54) TOOLS AND METHODS FOR UE ENVIRONMENT MAPPING

(71) Applicant: Telefonaktiebolaget LM Ericsson (publ), Stockholm (SE)

(72) Inventors: Deep Shrestha, Linköping (SE); Vijaya Parampalli Yajnanarayana, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 566 days.

(21) Appl. No.: 18/005,751

(22) PCT Filed: Jul. 31, 2020

(86) PCT No.: PCT/SE2020/050759
§ 371 (c)(1),
(2) Date: Jan. 17, 2023

(87) PCT Pub. No.: WO2022/025808
PCT Pub. Date: Feb. 3, 2022

(65) Prior Publication Data

US 2023/0296722 A1 Sep. 21, 2023

(51) Int. Cl.
*G01S 5/02* (2010.01)
*G01S 7/00* (2006.01)
(Continued)

(52) U.S. Cl.
CPC ............ *G01S 5/0269* (2020.05); *G01S 7/003* (2013.01); *G01S 13/765* (2013.01); *G01S 13/878* (2013.01); *H04W 64/003* (2013.01)

(58) Field of Classification Search
CPC ...... G01S 5/0269; G01S 7/003; G01S 13/765; G01S 13/878; G01S 2205/008; H04W 64/003; H04W 64/006
See application file for complete search history.

(56) References Cited

U.S. PATENT DOCUMENTS 10,261,168 B1 * 4/2019 Aditya .................. G01S 5/0278
2014/0064112 A1 3/2014 Das et al.
(Continued)

FOREIGN PATENT DOCUMENTS

JP 2006519389 A 8/2006
JP 2016519505 A 6/2016
JP 2017522776 A 8/2017

OTHER PUBLICATIONS

International Search Report and Written Opinion dated Apr. 23, 2021 for International Application No. PCT/SE2020/050759 filed Jul. 31, 2020; consisting of 11 pages.
(Continued)

*Primary Examiner* — Umair Ahsan
(74) *Attorney, Agent, or Firm* — Weisberg I.P. Law, P.A.

(57) ABSTRACT

A wireless communication device, WCD, transmits one or more uplink transmissions, obtains backscattering measurements for the one or more uplink transmissions, and reports the backscattering measurements to a wireless communication network. A network node in the wireless communication network receives the backscattering measurements, and estimates an environment of the WCD based on the backscattering measurements. The one or more uplink transmissions may for example include a sounding reference signal, SRS. The network node may for example schedule a transmission, select beamforming, or adapt a positioning reference signal configuration based on the estimated environment of the WCD. The network node may for example receive positioning measurements and estimate a position of the WCD based on the positioning measurements. The estimation of a position of the WCD and the estimation of an environment of the WCD may for example be performed jointly via simultaneous localization and mapping, SLAM.

12 Claims, 16 Drawing Sheets

(51) Int. Cl.

| | |
|---|---|
| ***G01S 13/76*** | (2006.01) |
| ***G01S 13/87*** | (2006.01) |
| ***H04W 64/00*** | (2009.01) |

(56) References Cited

U.S. PATENT DOCUMENTS

| | | | | |
|---|---|---|---|---|
| 2019/0132816 | A1* | 5/2019 | Xue | H04W 48/20 |
| 2019/0222330 | A1* | 7/2019 | Shan | H04W 64/006 |
| 2020/0236718 | A1 | 7/2020 | Sundararajan et al. | |

OTHER PUBLICATIONS

Japanese Decision to Grant and English machine translation dated Apr. 2, 2024 for Application No. 2023-506122, consisting of 7 pages.

3GPP TSG RAN WG1 Meeting #94 R1-1809348; Title: Considerations on NR Positioning; Agenda Item: 7.2.8; Source: Huawei, HiSilicon; Document for: Discussion and decision; Location and Date: Gothenburg, Sweden, Aug. 20-24, 2018, consisting of 9 pages.

3GPP TSG-RAN WG2 109-bis R2-2003822; Title: Measurement Reporting for UE based positioning; Agenda Item: 6.8.2.3; Source: Ericsson, Deutsche Telekom; Document for: Discussion, Decision; Location and Date: Electronic Meeting, Apr. 20-30, 2020, consisting of 8 pages.

* cited by examiner

TOOLS AND METHODS FOR UE ENVIRONMENT MAPPING

CROSS-REFERENCE TO RELATED APPLICATIONS

This application is a Submission Under 35 U.S.C. § 371 for U.S. National Stage Patent Application of International Application Number: PCT/SE2020/050759, filed Jul. 31, 2020 entitled "TOOLS AND METHODS FOR UE ENVIRONMENT MAPPING," the entirety of which is incorporated herein by reference.

TECHNICAL FIELD

The present disclosure generally relates to wireless communication, and particular to estimation of a position and an environment of a wireless communication device (WCD) such as a user equipment (UE).

BACKGROUND

The position of a wireless communication device (WCD) such as a user equipment (UE) may be important in the context of a Radio Access Network (RAN). Knowledge of the UE position may provide significant benefits to a wide range of applications ranging from emergency call localization (as mandated by the Federal Communications Commission, FCC) to support of industrial applications that benefit from UE position information.

Estimation of the UE position is a topic that has been widely studied in the 3rd Generation Partnership Project (3GPP). Since the 9th release of the 3GPP specification, 3GPP has put a significant effort into establishing an architecture to support UE positioning. In Long Term Evolution (LTE), positioning is supported by the architecture shown in FIG. 1. Addressing the RAN evolution towards New Radio (NR), positioning in a fifth generation (5G) network is supported by the architecture shown in FIG. 2. In both of these architectures, positioning can typically be done in both UE-assisted and UE-based modes. The UE-assisted positioning mode can further be realized either by exploiting Downlink (DL) or Uplink (UL) reference signals for positioning measurements. When a DL reference signal is used, the UE performs the positioning measurements and reports them to a Location Server (LS). In FIGS. 1 and 2, the LS is located at the E-SMLC. When a UL reference signal is used, the UE transmits the network-configured UL reference signal and nodes in the radio network performs the positioning measurements and reports them to the LS. In both these cases, the LS is the entity that estimates the UE position. In contrast to UE-assisted positioning, in UE-based positioning the UE performs the positioning measurements and does not report them to the LS. Instead, the LS provides assistance information to the UE (such as the positions of network nodes from which the DL reference signal is transmitted to the UE) and the UE estimates its own position using the positioning measurements and the assistance information.

Network performance may also be improved if the UE position is taken into account when designing and/or scheduling transmissions between the network and the UE. For example, in a situation where positioning key performance indicators (KPIs) are not met, it is beneficial that the positioning reference signal (PRS) transmission is optimized by identifying beams that results in better PRS reception by the UE and hence enhancing the positioning measurements. While network performance may benefit from knowledge of the UE position, it would be desirable to provide new ways of improving network performance.

SUMMARY

A first aspect provides embodiments of a method performed by a wireless communication device. The wireless communication device is configured for use in a wireless communication network. The method comprises transmitting one or more uplink transmissions, obtaining backscattering measurements for the one or more uplink transmissions, and reporting the backscattering measurements to the wireless communication network.

A second aspect provides embodiments of a method performed by a network node in a wireless communication network. The method comprises receiving backscattering measurements for one or more uplink transmissions, the backscattering measurements having been obtained by a wireless communication device that transmitted the one or more uplink transmissions, and estimating an environment of the wireless communication device based on the backscattering measurements.

A third aspect provides embodiments of a wireless communication device configured for use in a wireless communication network. The wireless communication device comprises processing circuitry and one or more memories. The one or more memories contain instructions executable by the processing circuitry whereby the wireless communication device is operative to transmit one or more uplink transmissions, obtain backscattering measurements for the one or more uplink transmissions, and report the backscattering measurements to the wireless communication network.

A fourth aspect provides embodiments of a network node. The network node comprises processing circuitry and one or more memories. The one or more memories contain instructions executable by the processing circuitry whereby the network node is operative to receive backscattering measurements for one or more uplink transmissions, the backscattering measurements having been obtained by a wireless communication device that transmitted the one or more uplink transmissions, and estimate an environment of the wireless communication device based on the backscattering measurements.

A fifth aspect provides embodiments of a method performed by a wireless communication device. The wireless communication device is configured for use in a wireless communication network. The method comprises receiving, from the wireless communication network, configuration of a downlink reference signal for positioning measurements, obtaining positioning measurements for one or more downlink transmissions comprising the downlink reference signal, transmitting one or more transmissions, obtaining backscattering measurements for the one or more transmitted transmissions, estimating a position of the wireless communication device based on the positioning measurements, and estimating an environment of the wireless communication device based on the backscattering measurements.

A sixth aspect provides embodiments of a wireless communication device configured for use in a wireless communication network. The wireless communication device comprises processing circuitry and one or more memories. The one or more memories contain instructions executable by the processing circuitry whereby the wireless communication device is operative to receive, from the wireless communication network, configuration of a downlink reference signal for positioning measurements, obtain positioning measurements for one or more downlink transmissions comprising the downlink reference signal, transmit one or more transmissions, obtain backscattering measurements for the one or more transmitted transmissions, estimate a position of the wireless communication device based on the positioning measurements, and estimate an environment of the wireless communication device based on the backscattering measurements.

It is noted that embodiments of the present disclosure relate to all possible combinations of features recited in the claims.

BRIEF DESCRIPTION OF THE DRAWINGS

In what follows, example embodiments will be described in greater detail with reference to the accompanying drawings, on which.

Figure 1:
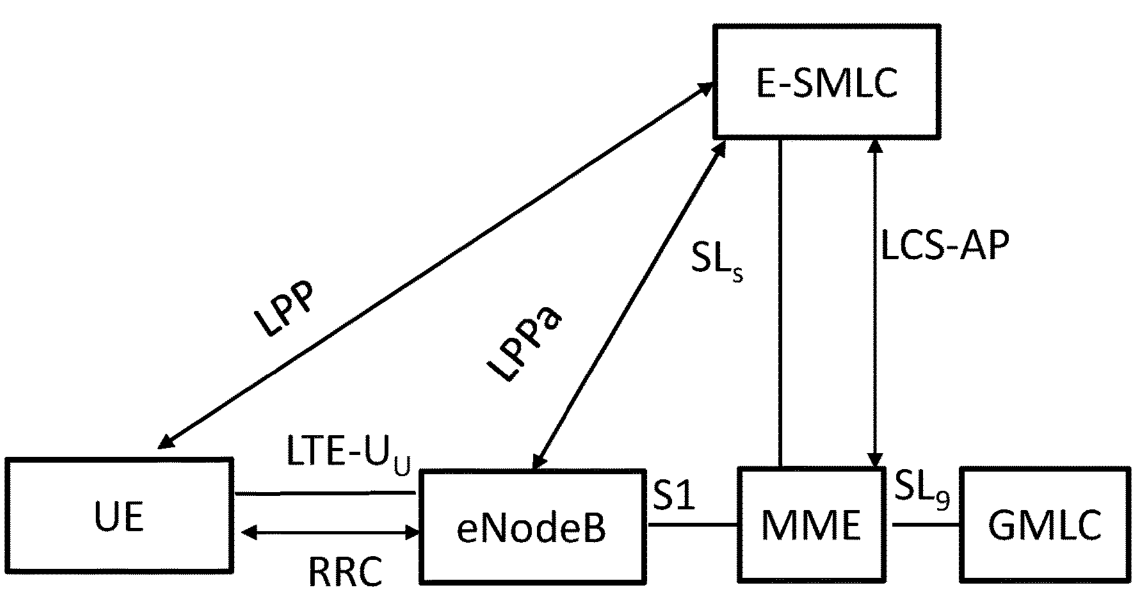
FIG. 1 shows an LTE positioning architecture.
Figure 2:
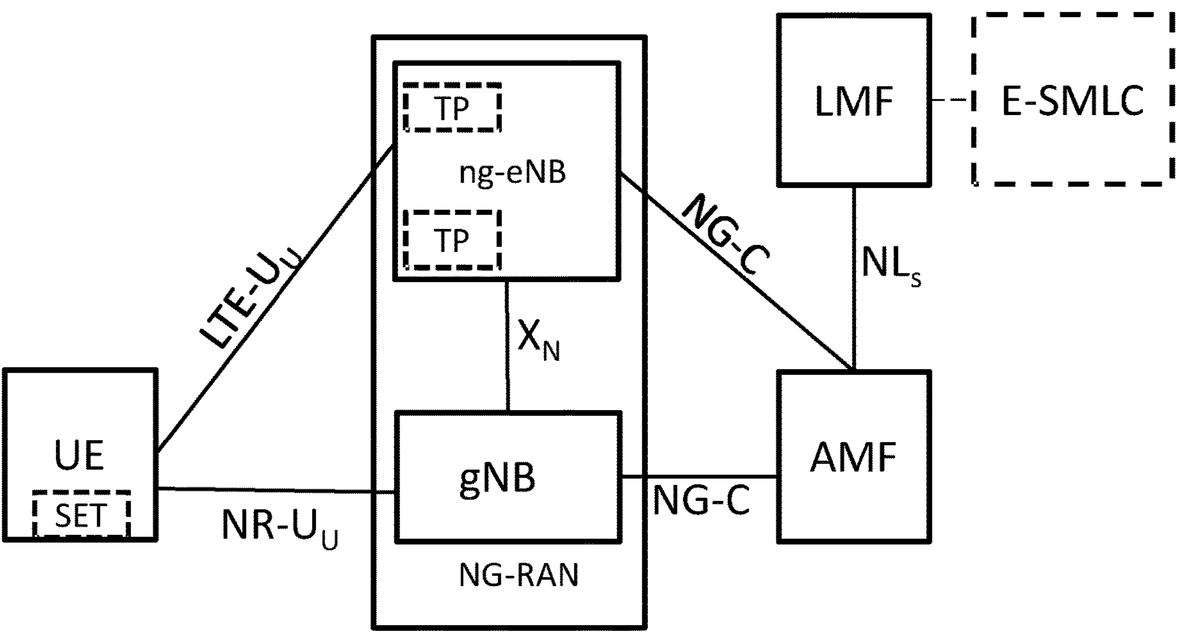
FIG. 2 shows an NR positioning architecture.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

The current implementations of RAN support UE positioning architecture that enables implementation of a multitude of positioning methods and techniques that are based on Cell ID (CID), Enhanced CID (ECID), Observed Time Difference of Arrival (OTDOA), Uplink Time Difference of Arrival (UTDOA), and Round-Trip Time (RTT). Among these, CID and ECID are UE agnostic methods and are less accurate and are typically outperformed by UE-assisted methods like OTDOA, UTDOA, and RTT in terms of UE positioning accuracy. The UE-assisted methods outperform UE-agnostic methods because UE-assisted methods are leveraged with an opportunity to do the positioning measurements such as Angle of Arrival (AoA), Time of Arrival (ToA), Reference Signal Received Power (RSRP), on high bandwidth reference signals that are transmitted by the network or the UE during a positioning occasion. UE-assisted methods may for example include positioning measurements on high bandwidth Downlink (DL) and high bandwidth Uplink (UL) reference signals respectively transmitted by the network within an OTDOA positioning occasion and by the UE within an UTDOA positioning occasion.

While knowledge of the UE position may be useful in several respects, knowledge of the UE environment may also provide advantages. Indeed, knowing the UE position alone cannot support a wide range of other applications where having information about the UE environment is crucial. In applications/use cases like autonomous driving cars, self-parking cars, detection of vulnerable road users (such as pedestrians and cyclists) etc., understanding the UE environment and the UE location in that environment is of utmost importance. Estimation of the UE environment is therefore desirable. Also, network performance may be improved if the UE environment is taken into account, for example when performing scheduling and/or beamforming. Performance of UE positioning may also be improved (or be made more reliable) if the UE environment is taken into account. For example, a Positioning Reference Signal (PRS) configuration may be adapted based on UE environment. In other words, knowledge of the UE environment may enable improved Quality of Service (QoS) for new and existing services, so that end users may experience better communication service performance.

In view of the above, the present disclosure presents methods which enable the UE environment to be estimated. In some embodiments, estimation of UE position and UE environment may be performed jointly via Simultaneous Localization and Mapping (SLAM). A model or map or digital twin of the UE environment may thereby be created.

As described above, during a positioning occasion a UE position is traditionally estimated with no information about the UE environment. In order to estimate the UE environment, the UE may in addition to the positioning measurements also exploit uplink signals configured by the network to perform additional measurements. Such additional measurements may be backscattering measurements such as backscattered signal received power to characterize the environment in the UE vicinity, ranging based on backscattered signal to estimate locations of objects/obstacles in the UE vicinity, and a doppler shift of the backscattered signal to determine the velocity of the objects/obstacles in the UE vicinity. Such backscattering measurements may be obtained, reported, and used in multiple different ways, as described below with reference to FIGS. 3-13.

Figure 3:
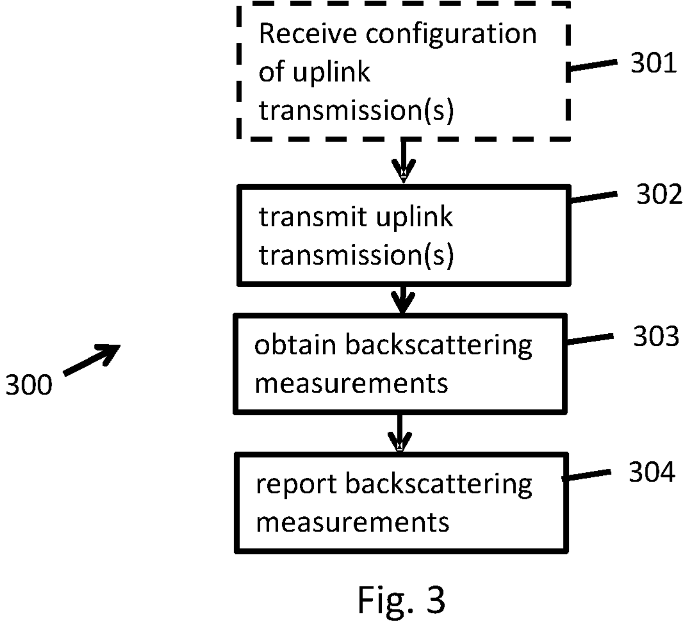
FIG. 3 is a flow chart of a method performed by a wireless communication device, according to an embodiment.

FIG. 3 is a flow chart of a method 300 performed by a wireless communication device (WCD) configured for use in a wireless communication network (for example a radio access network), according to an embodiment. The WCD may for example be a user equipment (UE). UE refers to any type of wireless device communicating with a network node and/or with another UE in a cellular or mobile communication system. Examples of UE are target device, device to device (D2D) UE, V2X UE, ProSe UE, machine type UE or UE capable of machine to machine (M2M) communication, PDA, iPAD, Tablet, mobile terminals, smart phone, laptop embedded equipped (LEE), laptop mounted equipment (LME), USB dongles etc. Example implementations of a WCD will be described further below with reference to FIG. 14. The WCD performing the method 300 may for example be arranged at (or may be mounted in or on) a vehicle, such as a car, a truck, a motorcycle, a bicycle or a drone.

The method 300 comprises transmitting 302 one or more uplink transmissions. The one or more UL transmissions could for example include more or less any uplink signal that the UE sends to the wireless communication network. The one or more uplink transmissions may for example comprise a reference signal, such as for example a sounding reference signal (SRS), a positioning reference signal (PRS), or a reference signal used during a random access channel (RACH) procedure. The one or more uplink transmissions may for example be transmitted by the WCD to the wireless communication network, for example to a network node in the wireless communication network. The wireless communication network may for example comprise a location server (LS), and the one or more uplink transmissions may for example be transmitted by the WCD to the LS.

The method 300 comprises obtaining 303 backscattering measurements for the one or more uplink transmissions. In other words, the one or more uplink transmissions transmitted at step 302 may be at least partially reflected at objects in an environment of the WCD, and may be received by the WCD. The WCD may perform measurements on such received reflected versions of the one or more uplink transmissions, to obtain measurement values. Measurements performed on such reflected signals or reflected transmissions are referred to herein as backscattering measurements. The WCD may for example performs filtering of the backscattered/reflected signals to extract only measurements of interest.

The backscattering measurements obtained at step 303 may for example comprise a backscattered signal received power, which may for example be indicative of which types of objects are present in an environment (or in a vicinity) of the WCD. For example, a signal backscattered from an object with a high reflection coefficient may be received with higher power than a signal backscattered from an object with lower reflection coefficient.

The backscattering measurements obtained at step 303 may for example comprise ranging information indicative of a distance between the WCD an object in a vicinity (or in an environment) of the WCD. The ranging information may for example be based on (or may for example comprise) a cross correlation (for example a cross correlation function or a cross correlation profile) between a transmitted version of a signal and a received backscattered version of the signal. A timing of a peak (which may for example be a local maximum or a global maximum) of the cross correlation may be indicative of a distance (or range) between the WCD and an object at which the signal has been reflected. However, ranging (or distance estimation) may be performed in other ways than using cross correlation.

The backscattering measurements obtained at step 303 may for example comprise a doppler shift of a backscattered signal. The doppler shift may for example be used to estimate a velocity of an object (or of a target) in a vicinity (or in an environment) of the WCD.

The backscattering measurements obtained at step 303 may for example be obtained using a different set of at least one antenna element or antenna panel than used for the transmission of the one or more uplink transmissions at step 302. In other words, the WCD may comprise one more antennal element (or antenna panel) for the transmission at step 302 and one or more other antennal element (or antenna panel) for the obtaining at step 303. Alternatively, a set of at least one antenna element or antenna panel may for example be used for transmitting the one or more uplink transmissions at step 302 and for obtaining the backscattering measurements at step 303.

The method 300 comprises reporting 304 the backscattering measurements to the wireless communication network. The reporting of the backscattering measurements may for example include transmission of the backscattering measurements themselves, or transmission of values derived from the backscattering measurements, such as a distance to an object and/or a velocity of an object and/or a type of an object. The reporting may for example be made to the wireless communication network, for example to a network node in the wireless communication network. The WCD may for example report the backscattering measurements to a location server (LS) in the wireless communication network.

Optionally, the method 300 may further comprise receiving 301 configuration of the one or more uplink transmissions for backscattering measurements. The configuration may for example be received from the wireless communication network. The configuration may for example be received via downlink control information (DCI) or via radio resource control (RRC). The step 301 is typically performed before the steps 302-304.

Figure 4:
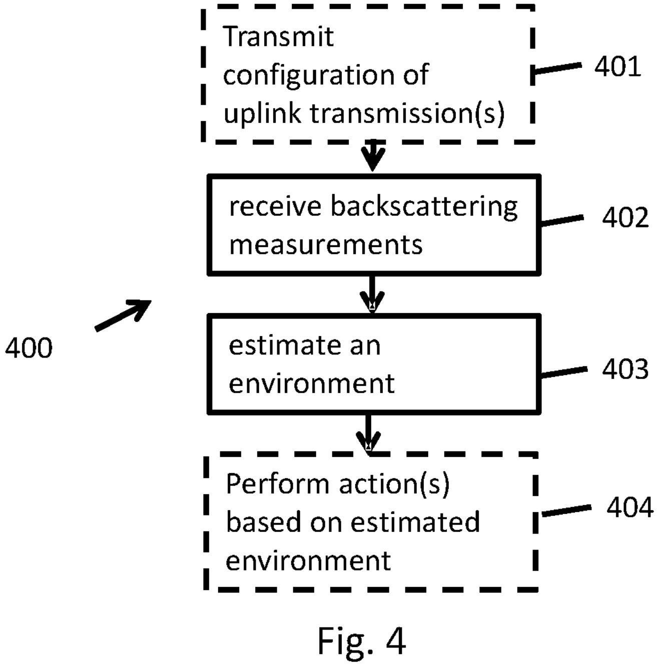
FIG. 4 is a flow chart of a method performed by a network node, according to an embodiment.

FIG. 4 is a flow chart of a method 400 performed by a network node in a wireless communication network. The method 400 may for example be performed by the network node while a WCD performs the method 300 described above with reference to FIG. 3. The network node may for example be referred to as a base station and may correspond to any type of radio network node or any network node, which communicates with a WCD (or UE) and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC) etc. Example implementations of the network node will be described further below with reference to FIG. 14. The network node performing the method 400 may for example be a location server (LS).

The method 400 comprises receiving 402 backscattering measurements for one or more uplink transmissions, where the backscattering measurements have been obtained by a WCD that transmitted the one or more uplink transmissions. The backscattering measurements received at step 402 may for example be the backscattering measurements reported by the WCD at step 304 in the method 300 described above with reference to FIG. 3. The backscattering measurements may for example be received directly from the WCD, or indirectly from the WCD via one or more network nodes in the wireless communication network.

As described above with reference to FIG. 3, the one or more uplink transmissions may for example comprise a reference signal, such as for example a sounding reference signal (SRS), or a positioning reference signal (PRS), or a reference signal used during a random access channel (RACH) procedure. The one or more uplink transmissions may for example be transmitted by the WCD to the wireless communication network, but may not necessarily be received by the network node performing the method 400.

As described above with reference to FIG. 3, the backscattering measurements may for example comprise a backscattered signal received power, and/or ranging information indicative of a distance between the wireless communication device an object in a vicinity of the wireless communication device, and/or doppler shift of a backscattered signal.

The method 400 comprises estimating 403 an environment of the WCD based on the backscattering measurements. The network node may for example create a model or digital twin of the environment of the WCD. The network node may for example track how the WCD moves in that model (or in that digital twin).

The method 400 may optionally comprise a step 404, in which one or more action is performed based on the environment of the WCD estimated at step 403. Such actions will be described below, all with the same reference number 404.

The method 400 may for example comprise scheduling 404 a transmission based on the estimated environment of the WCD. The scheduled transmission may for example be a downlink transmission to the WCD or an uplink transmission from the WCD. Scheduling may for example be adapted to the environment of the WCD in the sense that a frequency resource and/or a time resource and/or a coding and/or a transmission scheme and/or a transmission power of a transmission is adapted based on the environment, for example to make the transmission more robust/reliable in a less favorable environment for radio transmissions. As described below with reference to FIGS. 8-10, a method such as 400 may optionally comprise a step where a position of the WCD is estimated. The scheduling at step 404 may optionally be based also on an estimated position of the WCD. In other words, the scheduling at step 404 may be based on both an estimated position of the WCD and an estimated environment of the WCD.

The method 400 may for example comprise selecting 404 beamforming based on the estimated environment of the WCD. The direction and/or size and/strength of one or more beams used for the transmission may for example be adapted based on the estimated environment of the WCD. As described below with reference to FIGS. 8-10, a method such as the method 400 may optionally comprise a step where a position of the WCD is estimated. The beamforming at step 404 may optionally be based also on an estimated position of the WCD. In other words, the beamforming at step 404 may be selected based on both an estimated position of the WCD and an estimated environment of the WCD.

The method 400 may for example comprise adapting 404 a positioning reference signal (PRS) configuration based on the estimated environment of the WCD. A certain PRS configuration may be more robust/reliable than other PRS configurations in a less favorable environment for radio transmissions. As described below with reference to FIGS. 8-10, a method such as the method 400 may optionally comprise a step where a position of the WCD is estimated. The adaption of the PRS configuration at step 404 may optionally be based also on an estimated position of the WCD. In other words, the adaption of the PRS configuration at step 404 may be selected based on both an estimated position of the WCD and an estimated environment of the WCD.

The WCD may for example be arranged at a vehicle such as a car, truck, motorcycle, bicycle or a drone. The method 400 may for example comprise transmitting one or more signals for controlling the vehicle based on the estimated environment of the WCD. The one or more signals may for example be transmitted directly to the WCD or indirectly to the WCD, for example via one or more network nodes. Since the WCD is arranged at the vehicle, the estimated environment of the WCD may also be indicative of an environment of the of the vehicle. The vehicle may for example be controlled to avoid obstacles, such as other vehicles or vulnerable road users. The network node (for example allocation server) performing the method 400 may for example have more processing resources than the WCD and the car, and may be better suited than the WCD to create a real-time model or digital twin of the environment of the WCD. As described below with reference to FIGS. 8-10, a method such as the method 400 may optionally comprise estimating a position of the WCD. The control of the vehicle at step 404 may optionally be based also on an estimated position of the WCD. In other words, control of the vehicle at step 404 may be performed based on both an estimated position of the WCD and an estimated environment of the WCD.

Another example scenario where the network node performing the method 400 may be better suited than the WCD to estimate the environment of the WCD is if a map of an unknown environment is to be built, such as a map over an area where a disaster might have happened. In such a scenario, it may be more efficient that the network does most (or all of) the calculations, since the network may be more efficient from energy consumption point of view and/or from a computational capability point of view, compared to the WCD.

The method 400 may for example comprise estimating a future position or trajectory of the WCD relative to the estimated environment of the WCD, and performing one or more of the following based on the estimated future position or trajectory: scheduling a transmission, or selecting beamforming, or adapting a positioning reference signal configuration. The network node performing the method 400 may for example predict when conditions for radio transmissions to/from the WCD are likely to be good or bad, and may adapt scheduling, beamforming, or positioning reference signal configuration to take this into account.

The method 400 may optionally comprise transmitting 401 configuration of the one or more uplink transmissions for backscattering measurements at the WCD. The step 401 is typically performed before the steps 402-404. The configuration transmitted at step 401 may for example be the same configuration as received by the WCD at step 301 in the method 300, described above with reference to FIG. 3.

In the methods 300 and 400 described above with reference to FIGS. 3 and 4, the one or more uplink transmissions transmitted by the WCD may for example include a first portion located in a first frequency range and a second portion located in a second frequency range. The backscattering measurements may for example include measurements in the first and second frequency range. The first frequency range may for example a be a lower frequency range, such as frequency range 1 (FR1) for NR, and the second frequency range may for example be a higher frequency range, such as frequency range 2 (FR2) in NR. Use of frequencies from different frequency ranges for the backscattering measurements may for example increase the accuracy and/or resolution of the estimated environment of the WCD. This setup may be beneficial when the environment of the WCD is quite heterogenous. The WCD may for example transmit the one or more uplink transmissions in both FR1 and FR2 at once, or may switch between these frequency ranges over time. Separate antenna panels/elements may for example be used for the different frequency ranges.

The backscattering measurements obtained at step 303 in the method 300 may for example comprise back-scattering measurement from high-band frequencies, since such measurements may provide better spatial resolution. Such backscattering measurements are for example possible in multi carrier cellular systems where both low and high bands are employed.

In the methods 300 and 400 described above with reference to FIGS. 3 and 4, one or more uplink transmissions are used for the backscattering measurements. Such uplink transmissions may already be used by the wireless communication network for other purposes (such as for channel estimation, for positioning, or for a RACH procedure), so there may be no need for the WCD to transmit additional signals for performing the backscattering measurements. The receiver (or RX) equipment of the WCD used for communication with the wireless communication network may for example be sufficient for performing the backscattering measurements, so no additional hardware may be needed for the backscattering measurements. The WCD may for example transmit the one or more uplink signals in Tx mode, and then quickly switch to Rx mode soon after Tx is complete to measure backscattered signals. In other words, for the backscattered signal measurements, the WCD may switch between transmission and reception without using separate antennal panel/element for uplink transmission and backscattered reception.

Use of SRS for the backscattering measurements may for example be advantageous since the SRS may be configured with maximum allowed bandwidth, which may improve accuracy of environment estimations performed based on the backscattering measurements. The approach provided by the methods 300 and 400 may for example be regarded as a RAN based UE environment mapping scheme.

The approach provided by the methods 300 and 400 may for example support use cases like detection of vulnerable road users (such as pedestrians or cyclists), mapping of an unknown environment to support first responders etc. where information beyond positioning is typically needed. Earlier existing solutions, such as autonomous vehicles, typically use their own dedicated radar signals, and do not use RAN-based uplink signals (such as uplink reference signals) like those used in the methods 300 and 400.

Figure 5:
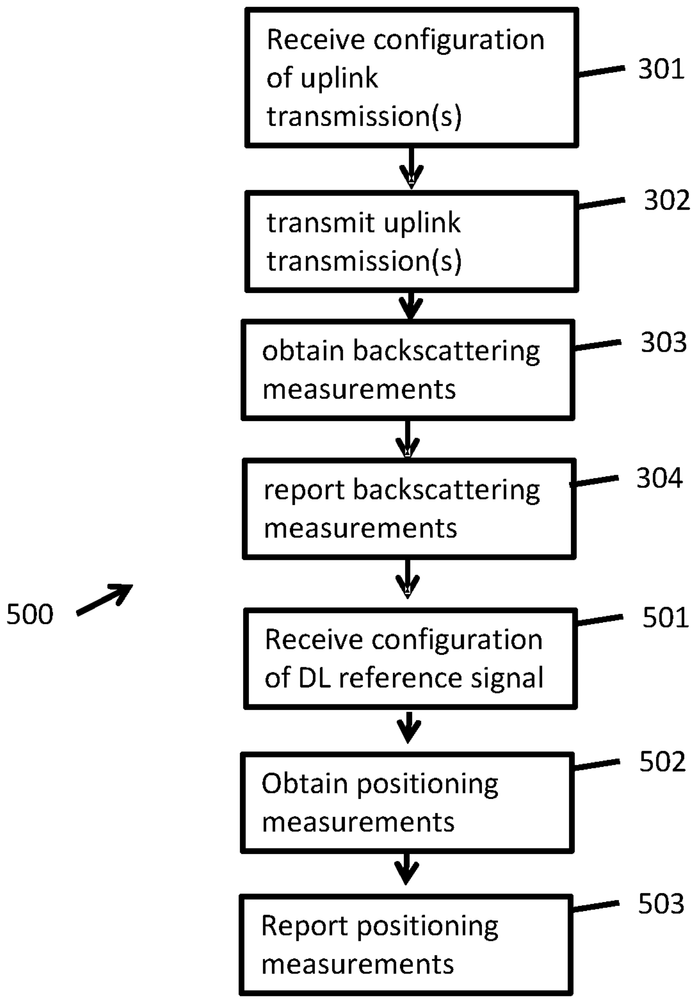
FIG. 5 is a flow chart of a method performed by a wireless communication device, according to an embodiment where positioning is based on a downlink reference signal.

FIG. 5 is a flow chart of a method 500 performed by a WCD, according to an embodiment where position estimation is performed by a wireless communication network based on a downlink (DL) reference signal. In this embodiment, the WCD reports backscattering measurements in addition to positioning measurements. The WCD may for example report positioning measurements as part of OTDOA based positioning, and the backscattering measurements and the positioning measurements may for example be reported during an OTDOA based positioning occasion.

The method 500 comprises the steps 301-304 from the method 300 described above with reference to FIG. 3.

The method 500 further comprises receiving 501 configuration of a downlink reference signal for positioning measurements. The downlink reference signal may for example be a positioning reference signal (PRS).

The method 500 further comprises obtaining 502 positioning measurements for one or more downlink transmissions comprising the downlink reference signal. The WCD may for example perform measurements on the one or more downlink transmissions to obtain measurement values which can be used for estimating a position of the WCD. The positioning measurements may for example comprise a time of arrival (ToA) measurement, and/or an angle of arrival (AoA) measurement, and/or a reference signal received power (RSRP) measurement. The positioning measurements may for example be obtained for downlink transmissions from a plurality of network nodes, such as at least three or at least four network nodes, so that the position of the UE may be estimated based on the positioning measurements. The backscattering estimates obtained at step 303 may for example be obtained during the same positioning occasion as the positioning estimates obtained at step 502.

The method 500 further comprises reporting 503 the positioning measurements to the wireless communication network. The WCD may for example report actual measurement data, or may report data derived or computed based on the measurements performed by the WCD.

The reporting 503 of the positioning measurements may for example be performed together with the reporting 304 of the backscattering measurements. The positioning measurements and the backscattering measurements may for example be reported in the same message to the wireless communication network, such as in a LTE Positioning Protocol (LPP) Provide Location Information message.

Figure 6:
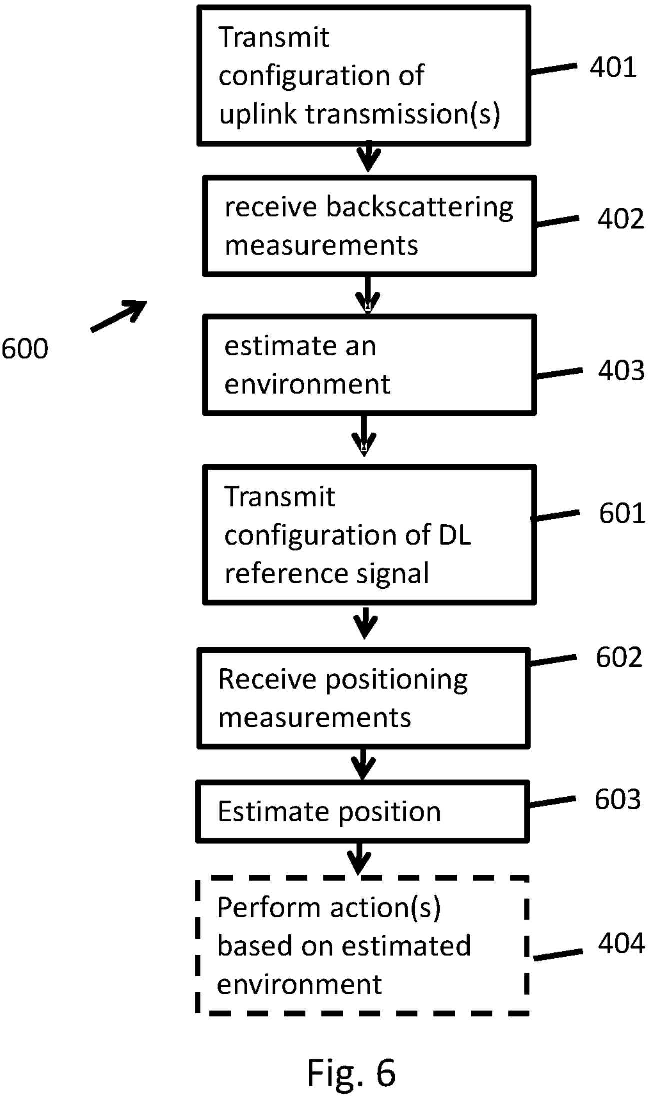
FIG. 6 is a flow chart of a method performed by a network node, according to an embodiment where positioning is based on a downlink reference signal.

FIG. 6 is a flow chart a method 600 performed by a network node, according to an embodiment where positioning is based on a downlink reference signal. In this embodiment, a wireless communication network configures a WCD (for example the WCD that performs the method 500) with a downlink reference signal for positioning measurements and an uplink reference signal for backscattering measurements. OTDOA based positioning may for example be performed by the network node. The backscattering measurements may for example be obtained by the WCD based on backscattering of an uplink transmission during an OTDOA based positioning occasion.

The method 600 comprises the steps 401-403 (and optionally also the step 404) from the method 400 described above with reference to FIG. 4.

The method 600 comprises transmitting 601 configuration of a downlink reference signal for positioning measurements at the WCD. Transmitting 601 the configuration of the downlink reference signal may for example comprise informing a plurality of network nodes to transmit the downlink reference signal, and/or informing the WCD to obtain the positioning measurements for the downlink reference signal.

The method 600 comprises receiving 602 positioning measurements. The positioning measurements for the downlink reference signal may for example be received directly from the WCD, or indirectly from the WCD via one or more network nodes in the wireless communication network. The positioning measurements may for example comprise a time of arrival measurement, and/or an angle of arrival measurement, and/or a reference signal received power measurement.

The method 600 comprises estimating 603 a position of the WCD based on the positioning measurements received at step 602. The positioning measurements received at step 602 may for example include positioning measurements obtained at the WCD for a plurality of network nodes (for example at least three or at least four network nodes) so that the position of the WCD can be estimated. However, the position of the WCD could for example be estimated based on positioning measurements for fewer than three network nodes if the positioning is based on additional information, such as backscattering measurements and/or map-based information.

The estimation 603 of a position of the WCD and the estimation 403 of an environment of the WCD may for example be performed jointly via simultaneous localization and mapping (SLAM).

In the methods 500 and 600 described above with reference to FIGS. 5-6, the one or more uplink transmissions from WCD (and used for backscattering measurements) may for example have different modulation than the downlink reference signal transmitted from the network (and used for positioning measurements).

Figure 7:
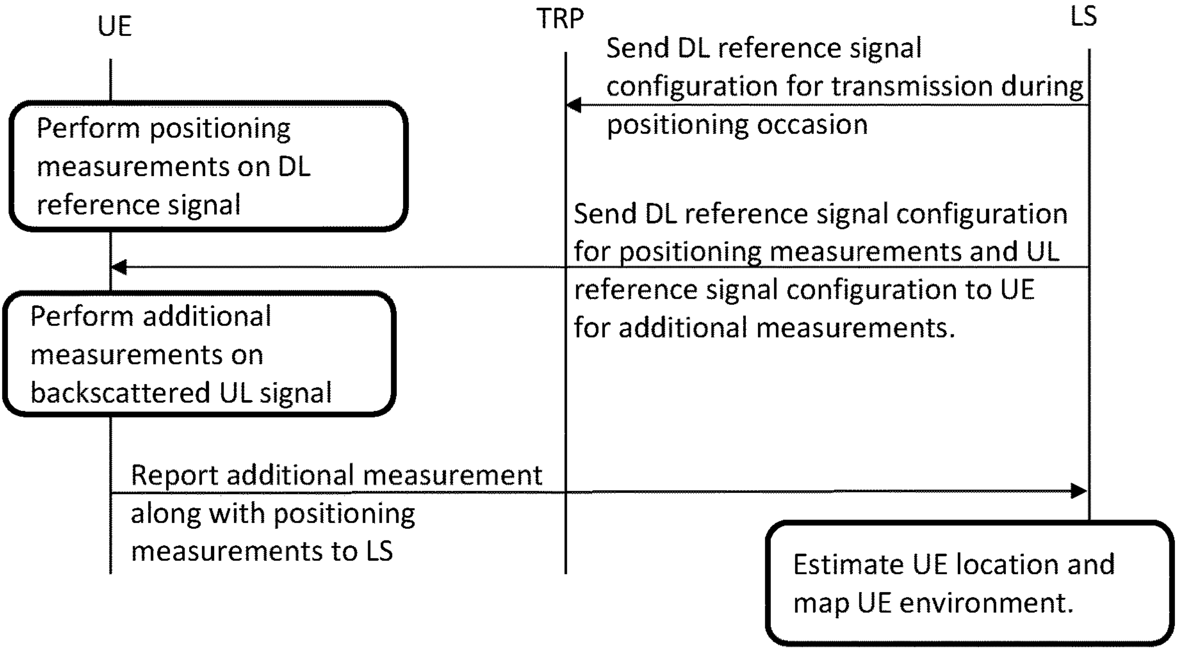
FIG. 7 shows signaling used in an example implementation of the methods shown in FIGS. 5-6.

FIG. 7 shows signaling used in an example implementation of the methods 500 and 600 described above with reference to FIGS. 5-6. The signaling flow shown in FIG. 7 may for example take place during an OTDOA positioning occasion. The WCD is exemplified in FIG. 7 by a user equipment (UE). The network node performing the position estimation is exemplified in FIG. 7 by a location server (LS). The network nodes transmitting the downlink reference signals are indicated in FIG. 7 by a transmission and reception point (TRP).

As shown in FIG. 7, the UE is configured by the network to perform positioning measurements on a downlink (DL) reference signal, and the network nodes are configured to transmit the DL reference signal during a positioning occasion. The network also configures the UE with an UL reference signal, such as a Sounding Reference Signal (SRS). While the UL reference signal may be employed by the network for other purposes (such as estimating the quality of an uplink channel), it may also be used by the UE for backscattering measurements. While the UE performs the required positioning measurements, the UE can meanwhile also transmit the uplink (UL) reference signal to collect backscattering measurements (such as backscattered signal power, ranging based on a backscattered signal, and Doppler shift of the backscattered signal). After collecting these measurements, the UE reports them back to the LS. After receiving these measurements, the LS can estimate the UE location and the UE environment. The LS may for example determine a model or a digital twin of the UE environment based on the UE reported backscattering measurements.

Figure 8:
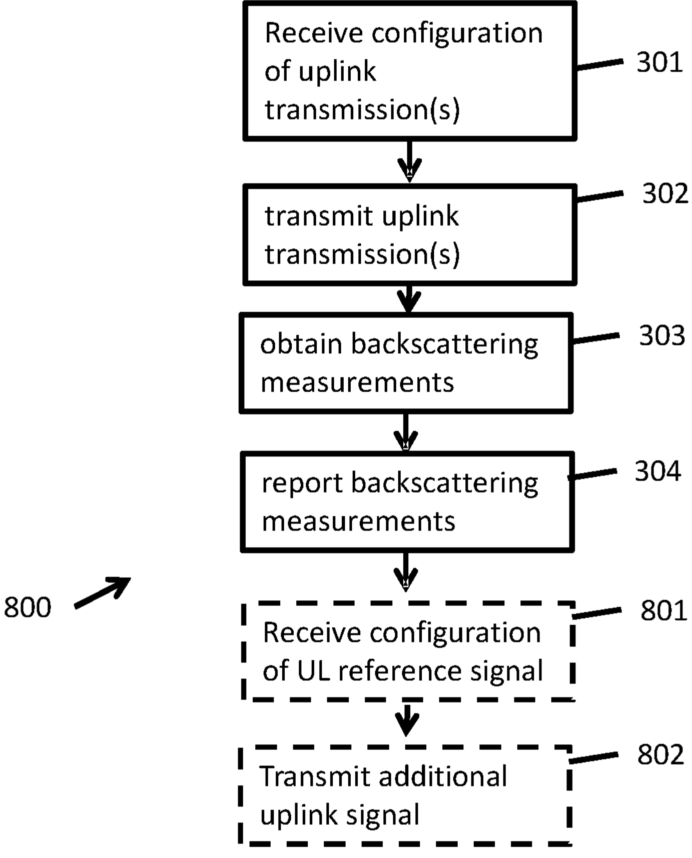
FIG. 8 is a flow chart of a method performed by a wireless communication device, according to an embodiment where positioning is based on an uplink reference signal.

FIG. 8 is a flow chart of a method 800 performed by a WCD, according to an embodiment where positioning estimation is performed by a wireless communication network based on an uplink (UL) reference signal. In this embodiment, the WCD transmits an UL reference signal for positioning measurements at network nodes. The wireless communication network may for example perform UTDOA based positioning, and the WCD may for example report the backscattering measurements during an UTDOA based positioning occasion.

The method 800 comprises the steps 301-304 from the method 300 described above with reference to FIG. 3.

The method 800 comprises receiving 801 configuration of an UL reference signal for positioning measurements, such as an uplink positioning reference signal (PRS). The WCD is then supposed to transmit the UL reference signal during a positioning occasion (such as an UTDOA positioning occasion). The one or more UL transmissions configured at step 301 may for example comprise the UL reference signal, so the additional configuration step 801 is indicated as optional in FIG. 8. In such an example scenario, the one or more UL transmissions may be transmitted during a positioning occasion, and may be employed for both backscattering measurements by the WCD and positioning measurements by the network during the positioning occasion. Such an UL transmission used for both backscattering measurements by the WCD and positioning measurements by the network may for example comprise a positioning reference signal (PRS).

If, on the other hand, the one or more UL transmissions configured at step 301 do not comprise the UL reference signal for positioning measurements, then the method 800 may further comprise transmitting 802 an additional UL transmission, where the additional UL comprises the UL reference signal. The additional UL transmission may for example be transmitted during a positing occasion (such as an UTDOA positioning occasion).

In the embodiment described with above reference to FIG. 8, the backscattering measurements obtained at step 303 may for example be obtained by the WCD by performing measurements during (or within) an UTDOA positioning occasion (for example during an positioning occasion during which the UL reference signal configured at step 801 is transmitted by the WCD).

Figure 9:
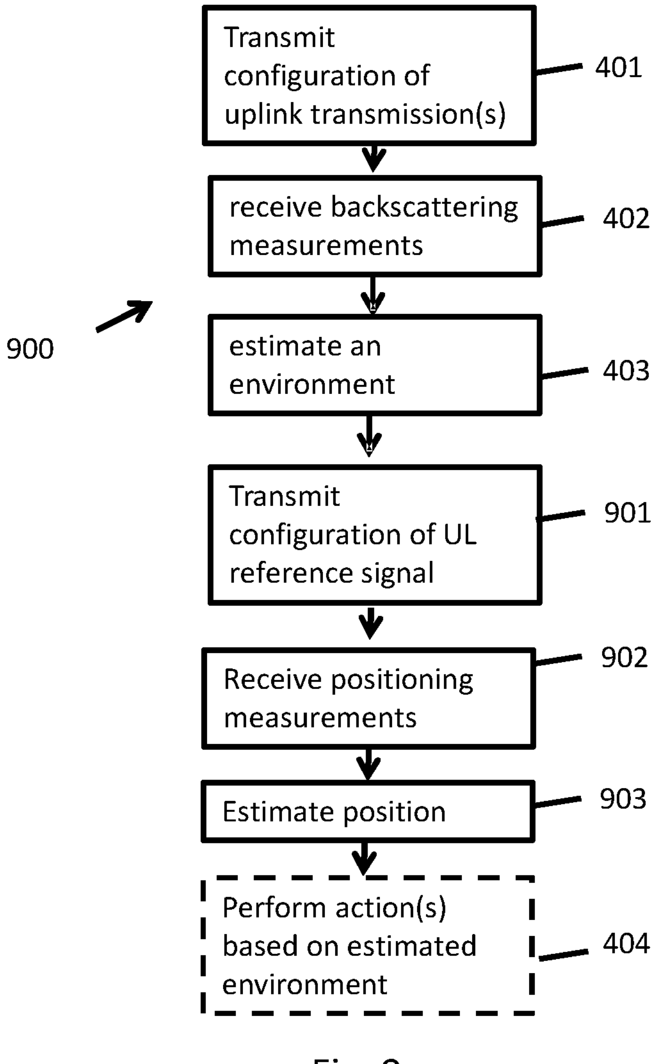
FIG. 9 is a flow chart of a method performed by a network node, according to an embodiment where positioning is based on an uplink reference signal.

FIG. 9 is a flow chart of a method 900 performed by a network node, according to an embodiment where positioning is based on an UL reference signal. The method 900 may for example be performed by a network node that performs UTDOA based positioning.

The method 900 comprises the steps 401-403 (and optionally also step 404) from the method 400 described above with reference to FIG. 4.

The method 900 comprises transmitting 901 configuration of an UL reference signal for positioning measurements at a plurality of network nodes in the wireless communication network. Transmitting 901 the configuration of the UL reference signal may for example comprise informing the WCD to transmit the UL reference signal, and/or informing the plurality of network nodes to obtain the positioning measurements for the UL reference signal. The one or more UL transmissions configured at step 401 may for example comprise the UL reference signal referred to at step 901. In such a scenario, there may be no need for the network node to separately configure the WCD with the UL reference signal at step 901, since the configuration at step 401 may be sufficient, but the plurality of network nodes may still need to be informed about the UL reference signal via the step 901. If, on the other hand, the one or more UL transmissions configured at step 401 do not comprise the UL reference signal referred to at step 901, then the WCD may need to be separately configured with the UL reference signal at step 901.

The method 900 comprises receiving 902 positioning measurements. The positioning measurements received at step 902 may for example be positioning measurements obtained by one or more network nodes which perform measurements for the UL reference signal configured at step 901. The positioning measurements may for example be received 902 from the one or more network nodes which performed the measurements. The positioning measurements received at step 902 may for example comprise a time of arrival measurement, and/or an angle of arrival measurement, and/or a reference signal received power measurement. The transmission of the UL reference signal by the WCD and the measurements on the UL reference signal by the one or more network nodes may for example be performed during an UTDOA positioning occasion.

The method 900 comprises estimating 903 a position of the WCD based on the positioning measurements. The positioning measurements received at step 902 may for example include positioning measurements obtained by a plurality of network nodes (for example at least three or at least four network nodes) so that the position of the WCD can be estimated. However, the position of the WCD could for example be estimated based on positioning measurements obtained by fewer than three network nodes if the positioning is based on additional information, such as backscattering measurements and/or map-based information. Embodiments may also be envisaged in which the network node performing the method 900 is one or the network nodes that performs positioning estimates on an UL reference signal transmitted by the WCD. In such embodiments, the estimation at step 903 may for example be performed based on one or more positioning measurements obtained via measurements performed locally at the same network node and based on further positioning estimates received at step 902 from other network nodes.

The estimation 903 of a position of the WCD and the estimation 403 of an environment of the WCD may for example be performed jointly via simultaneous localization and mapping (SLAM).

Figure 10:
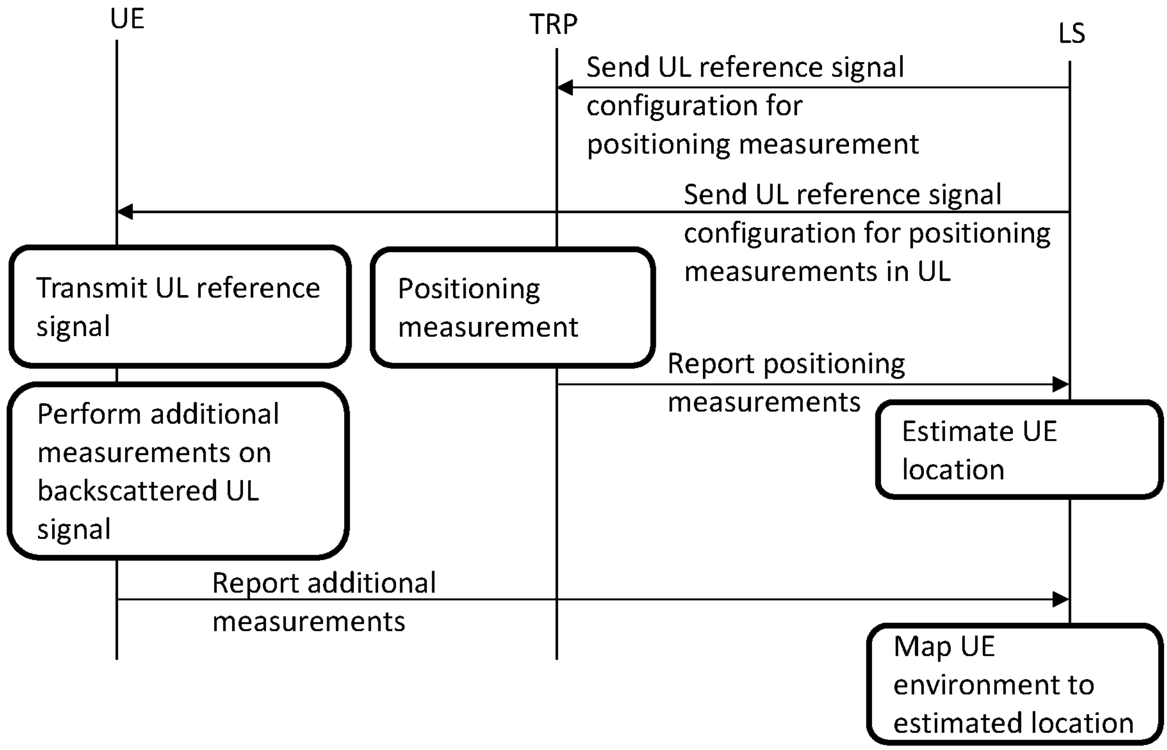
FIG. 10 shows signaling used in an example implementation of the methods shown in FIGS. 8-9.

FIG. 10 shows signaling used in an example implementation of the methods 800 and 900 described above with reference to FIGS. 8-9. The signaling flow shown in FIG. 10 may for example take place during an UTDOA positioning occasion. The WCD is exemplified in FIG. 10 by a user equipment (UE). The network node performing the position estimation is exemplified in FIG. 10 by a location server (LS). The network nodes performing positioning measurements on the uplink reference signal are indicated in FIG. 10 by a transmission point (TRP).

As shown in FIG. 10, the UE is configured by the LS to transmit a UL reference signal for positioning measurements to be done at the network side. The UE also performs backscattering measurements such as backscattered signal power, and/or ranging based on backscattered signal, and/or a Doppler shift of the backscattered signal. After collecting the backscattering measurements the UE reports them back to the LS. After receiving these backscattering measurements from the UE and the positioning measurements from the network nodes, the LS can estimate the UE location and the UE environment. The LS may for example determine a digital twin of the UE environment.

Figure 11:
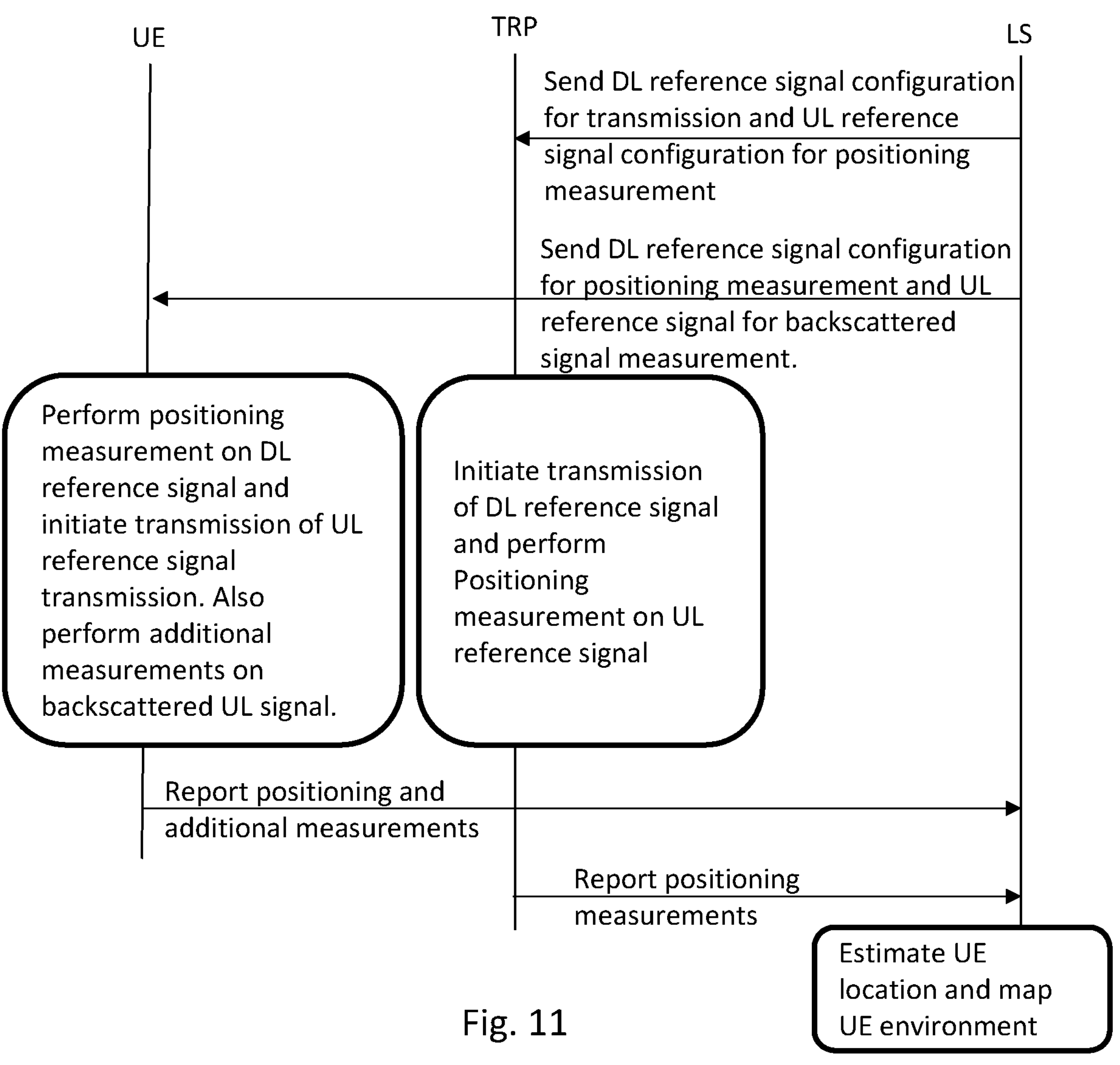
FIG. 11 shows signaling used in an example setup with an uplink reference signal for backscattering measurements together with RTT based positioning.

During an RTT positioning occasion, the WCD is typically configured with both DL and UL reference signals for positioning measurements. In other words, the WCD receives a DL reference signal configuration to do the positioning measurement (such as, but not limited to AoA, ToA, and RSRP) on. In addition, the WCD also receives an UL reference signal configuration that it has to transmit for positioning measurements (such as, but not limited to, backscattered signal power, ranging based on backscattered signal, and Doppler shift based on backscattered signal observed during UL transmission) at a plurality of network nodes. A signaling flow for this setup is illustrated in FIG. 11. The WCD is exemplified in FIG. 11 by a UE. The network nodes are indicated in FIG. 11 by TRP. The network node performing the estimations is exemplified in FIG. by a LS.

In the setup illustrated in FIG. 11, the UL reference signal can be used for both positioning and backscattering measurements. As shown in FIG. 11, the UE performs positioning measurement such as, but not limited to, AoA, ToA, and RSRP on the DL reference signal configured by the network. UE transmits the UL reference signal configured by the network. In addition, the UE performs additional measurements during the UL transmission (such as, but not limited to, backscattered signal power, ranging based on backscattered signal, and Doppler shift of the backscattered signal observed during UL transmission). After collecting these measurements the UE reports them back to the LS. The LS receives these measurements from the UE and positioning measurements from network nodes. The LS can then estimate the UE location based on the positioning measurements from the UE and the network nodes. The LS can also estimate the UE environment based on the backscattering measurements from the UE. The LS may for example combine the estimated position with the backscattering measurements reported by the UE to create a digital twin of the UE environment.

Figure 12:
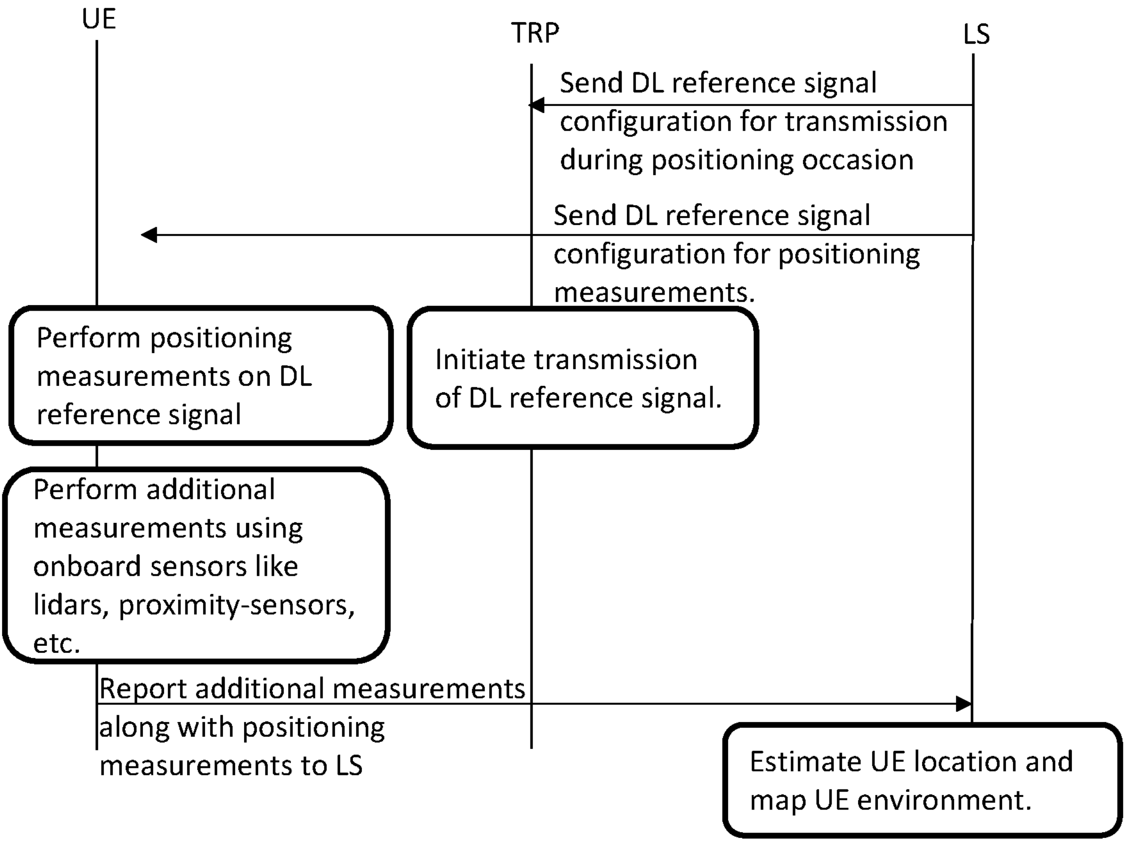
FIG. 12 shows signaling used in an example setup with custom sensing signaling for backscattering measurements together with OTDOA based positioning.

Embodiments have been described above where the WCD makes backscattering measurements using one or more uplink signals. Embodiment may also be envisaged in which the WCD uses custom sensing signaling (instead of the one or more uplink signals or in addition to the one or more uplink signals) to improve various aspects of the environment measurements, such as spatial resolution, penetrating ability, etc. The backscattering from these custom signals may for example be measured using onboard sensors like lidars, proximity-sensors, etc., and a measurement report comprising such measurement may be transmitted from the WCD to the LS. A signaling flow for such a setup together with OTDOA based positioning is shown in FIG. 12.

As described above, in addition to UE positioning, embodiments of the proposed scheme allows to create a digital twin of the UE environment to enable new use cases where SLAM is required and to optimize existing radio access-based services.

Embodiments disclosed herein may for example be used to create a map of an unknown environment. In such a procedure, the UE position can be estimated by a positioning procedure established in LTE and NR. Once the positioning measurement is acquired, the UE can do the backscatter signal measurements. By combining these two types of information, a map of an unknown environment can be created. Such maps may be useful to first responders dispatched to a disaster area. This type of map not only allows first responders to understand the disaster scenario better but can also allow them to plan emergency service deployment better.

In a vehicular use case (could be a manned or an unmanned vehicle) of embodiments disclosed herein, backscattering measurements on uplink radio access technology (RAT) radio signals can be used to detect presence of vulnerable road users (VRUs) in the vicinity of the vehicle. Once presence of VRUs is detected, precautious or preventive actions can be taken by the vehicle (either automatically for an unmanned vehicle, or by the driver of a manned vehicle) to avoid collision.

In embodiments disclosed herein, the location server (LS) may make use of the UE location and UE environment mapping information to optimize radio resource management to provide better communication service to end users. Beam alignment is typically done based on beam correspondence between the network and the UE. During this procedure, information about UE environment is traditionally not considered. If UE mapping information is available to the network, beam configuration can then be performed more precisely addressing the UE environment condition for better QoS to the UE. UE mapping information can also be used by the network to better configure PRS that is tailored to the UE environment and UE location. Typically, when transmission and reception points (TRPs) are configured for PRS transmission, the location and environment condition of the UE is not considered. Due to this reason, positioning measurement from some TRPs are not useful, and thus positioning Key Performance Indicators (KPIs) are not met. If the UE position and its environment information is known (based on a first round of position and backscattering measurements reported by the UE), the network can select TRPs for PRS transmission reducing the energy that otherwise would have been wasted by transmitting PRS that does not contribute to precise UE position estimate. It may also enable the network to do a precise position of UE to meet positioning KPIs. The UE location and environment info can therefore also be used by the LS to optimize positioning reference signal transmission and configuration. Furthermore, the LS can use UE location and environment information to support new as well as existing radio access-based services.

Embodiments have been described above where a WCD (such as a UE) reports backscattering measurements to a network for the network (or a LS in the network) to estimate an environment of the WCD. However, embodiments may also be envisaged in which the WCD estimates its environment itself. Such an embodiment is described below with reference to FIG. 13.

Figure 13:
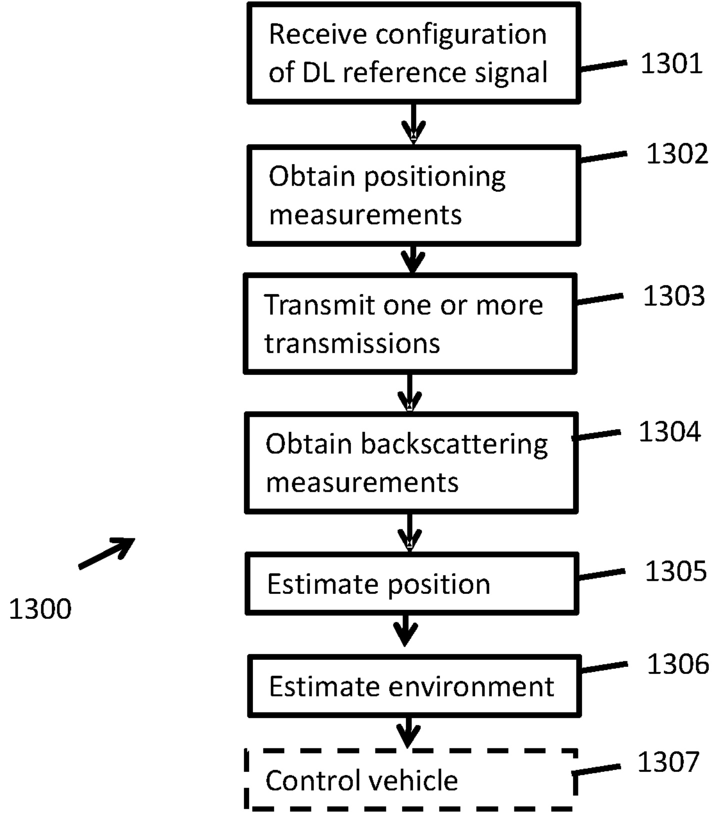
FIG. 13 shows a flow chart of a method performed by a wireless communication device, according to an embodiment where the wireless communication device estimates its own environment.

FIG. 13 is a flow chart of a method 1300 performed by a WCD configured for use in a wireless communication network, according to an embodiment. The WCD performing the method 1300 may for example be a WCD of the same type as the WCD performing the method 300, described above with reference to FIG. 3.

The method 1300 comprises receiving 1301, from the wireless communication network, configuration of a downlink reference signal for positioning measurements. A plurality of network nodes in the wireless communication network may be configured to transmit downlink transmissions comprising the downlink reference signal, and the WCD may be configured to perform measurements on such downlink transmissions to estimate its own position. The downlink reference signal may for example be a positioning reference signal, PRS.

The method 1300 comprises obtaining 1302 positioning measurements for one or more downlink transmissions comprising the downlink reference signal. The WCD may for example perform measurements on the downlink transmissions to obtain the positioning measurements. The positioning measurements may for example comprise a time of arrival measurement, and/or an angle of arrival measurement, and/or a reference signal received power measurement.

The method 1300 comprises transmitting 1303 one or more transmissions, and obtaining 1304 backscattering measurements for the one or more transmissions. The one or more transmissions may for example be transmitted to the wireless communication network. The one or more transmissions used at steps 1303-1304 may for example be one or more uplink transmissions of the same type as in steps 302-303 in the method 300 described above with reference to FIG. 3. The one or more transmissions used at steps 1303-1304 may for example comprise a sounding reference signal (SRS) or a positioning reference signal (PRS). However, the one or more transmissions used at steps 1303-1304 need not necessarily be uplink signals, but may instead be transmissions specifically designed or customized for backscattering measurements. The backscattering measurements may for example comprise a backscattered signal received power, and/or ranging information indicative of a distance between the WCD and an object in an environment of the WCD (for example, a cross correlation between a transmitted version of a signal and a received backscattered version of the signal may be used for estimating a distance between the WCD and an object in a vicinity of the WCD), and/or doppler shift of a backscattered signal.

The method 1300 comprises estimating 1305 a position of the WCD based on the positioning measurements. The WCD may for example exploit assistance data from the network (such as information about locations of network nodes transmitting the downlink reference signal) to estimate its own position.

The method 1300 comprises estimating 1306 an environment of the WCD based on the backscattering measurements.

The estimation 1305 of a position of the WCD and the estimation 1306 of an environment of the WCD may for example be performed jointly via simultaneous localization and mapping (SLAM).

The WCD performing the method 1300 may for example be arranged at a vehicle, such as a car, a truck, a motorcycle, a bicycle, or a drone. The method 1300 may optionally comprise transmitting 1307 one or more signals for controlling the vehicle based on the estimated environment of the WCD. In other words, the WCD may at least partially control the vehicle via one or more signals generated/determined based on the estimated environment of the WCD. The one or more signals controlling the vehicle may for example be generated/determined based on the estimated environment of the WCD and the estimated position of the WCD.

The method 1300 could be employed in use cases like autonomous driving cars, self-parking cars, etc. If a conventional LiDAR based method were to be combined with global position system (GPS) based positioning to generate a model of a vehicle environment, such a method would be limited to GPS coverage area only. Such solutions are not well suited for extreme use cases, such as creating map of an unknown environment where a disaster has happened, and where there is no GPS coverage available. If a wireless communication network provides coverage in the area, the method 1300 could be employed to generate a map of the area.

Embodiments of Wireless Communication Devices, Network Nodes, Computer Programs etc.

Figure 14:
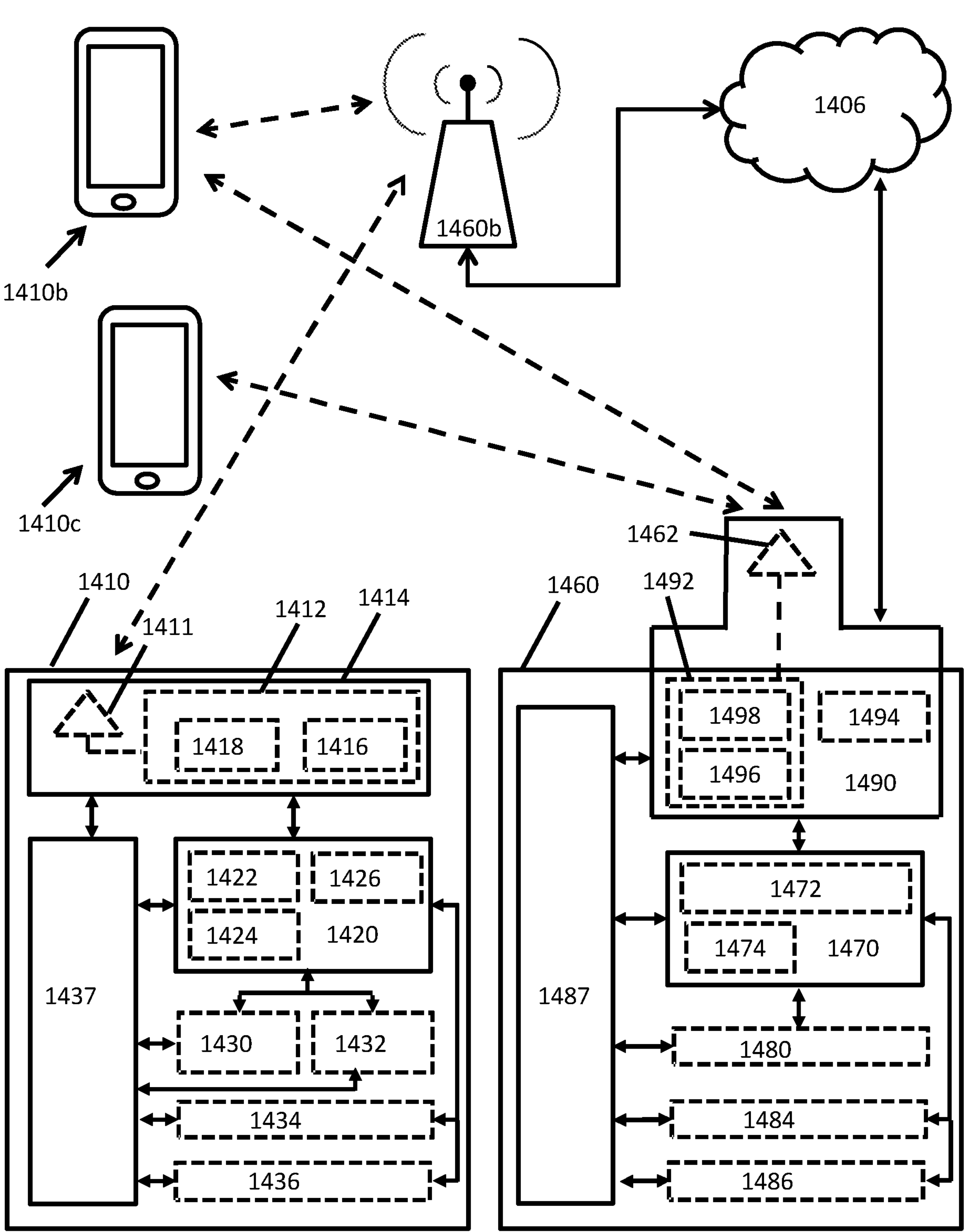
FIG. 14 shows a wireless network in accordance with some embodiments.

The methods performed by a wireless communication device (WCD) and described above with reference to FIGS. 3, 5, 7, 8, 10, 11 and 12 represent a first aspect of the present disclosure. Similarly, the method 1300 performed by a WCD and described above with reference to FIG. 13, represents a fifth aspect of the present disclosure. FIG. 14 shows a wireless network and will be further described in the next section. The WCD 1410, 1410*b* and 1410*c* (also referred to as wireless devices) described below with reference to FIG. 14 represent a third and sixth aspect of the present disclosure. The WCD 1410 (or the processing circuitry 1420 of the WCD 1410) may for example be configured to perform the method of any of the embodiments of the first aspect described above, and thereby represents the third aspect of the present disclosure. The WCD 1410 (or the processing circuitry 1420 of the WCD 1410) may for example be configured to perform any of the methods 300, 500 and 800 described above with reference to FIG. 3, FIG. 5 and FIG. 8, respectively. The WCD 1410 (or the processing circuitry 1420 of the WCD 1410) may for example be configured to perform the method of any of the embodiments of the fifth aspect described above, and thereby represents the sixth aspect of the present disclosure. The WCD 1410 (or the processing circuitry 1420 of the WCD 1410) may for example be configured to perform the method 1300, described above with reference to FIG. 3.

According to some embodiments, the WCD 1410 may comprise processing circuitry 1420 and one or more memories 1430 (or one or more device-readable media) containing instructions executable by the processing circuitry 1420 whereby the WCD 1410 is operable to perform the method of any of the embodiments of the first or fifth aspect described above.

It will be appreciated that a non-transitory computer-readable medium, such as for example the device-readable medium 1430, may store instructions which, when executed by processing circuitry 1420 of a WCD, cause the WCD to perform the method of any of the embodiments of the first or fifth aspect described above. It will also be appreciated that a non-transitory computer-readable medium 1430 storing such instructions need not necessarily be comprised in a WCD. On the contrary, such a non-transitory computer-readable medium 1430 could be provided on its own, for example at a location remote from the WCD.

It will be appreciated that the WCD 1410 need not necessarily comprise all those components described below with reference to FIG. 14. For a WCD 1410 according to an embodiment of the third aspect, it is sufficient that the WCD 1410 comprises means for performing the steps of the method of the corresponding embodiment of the first aspect. Also, for a WCD 1410 according to an embodiment of the sixth aspect, it is sufficient that the WCD 1410 comprises means for performing the steps of the method of the corresponding embodiment of the fifth aspect. Similarly, it will be appreciated that the processing circuitry 1420 need not necessarily comprise all those components described below with reference to FIG. 14.

The methods performed by a network node, described above with reference to FIGS. 4, 6, 7, 9, 10, 11, 12 represent a second aspect of the present disclosure. The network nodes 1460 and 1460*b* described below with reference to FIG. 14 represent a fourth aspect of the present disclosure. The network node 1460 (or the processing circuitry 1470 of the network node 1460) may for example be configured to perform the method of any of the embodiments of the second aspect described above. The network node 1460 (or the processing circuitry 1470 of the network node 1460) may for example be configured to perform the method 400 or 600 or 900 described above with reference to FIG. 4, FIG. 6, and FIG. 9, respectively.

According to an embodiment, the network node 1460 may comprise processing circuitry 1470 and one or more memories 1480 (or one or more device-readable media) containing instructions executable by the processing circuitry 1470 whereby the network node 1460 is operable to perform the method of any of the embodiments of the second aspect described above.

It will be appreciated that a non-transitory computer-readable medium, such as for example the device-readable medium 1480, may store instructions which, when executed by processing circuitry 1470 of a network node, cause the network node to perform the method of any of the embodiments of the second aspect described above. It will also be appreciated that a non-transitory computer-readable medium 1480 storing such instructions need not necessarily be comprised in a network node. On the contrary, such a non-transitory computer-readable medium 1480 could be provided on its own, for example at a location remote from the network node.

It will be appreciated that the network node 1460 need not necessarily comprise all those components described below with reference to FIG. 14. For a network node according to an embodiment of the fourth aspect, it is sufficient that the network node comprises means for performing the steps of the method of the corresponding embodiment of the second aspect. Similarly, it will be appreciated that the processing circuitry 1470 need not necessarily comprise all those components described below with reference to FIG. 14.

Overview of a Wireless Network and Parts Thereof

FIG. 14 shows a wireless network in accordance with some embodiments. Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460*b*, and WCD 1410, 1410*b*, and 1410*c* (also referred to as Wireless Devices, WDs). In practice, a wireless network may further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1460 are depicted as single boxes located within a larger box, or nested within multiple boxes, in practice, a network node may comprise multiple different physical components that make up a single illustrated component (e.g., device readable medium 1480 may comprise multiple separate hard drives as well as multiple RAM modules).

Similarly, network node 1460 may be composed of multiple physically separate components (e.g., a NodeB component and a RNC component, or a BTS component and a BSC component, etc.), which may each have their own respective components. In certain scenarios in which network node 1460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1460 may be configured to support multiple radio access technologies (RATs). In such embodiments, some components may be duplicated (e.g., separate device readable medium 1480 for the different RATs) and some components may be reused (e.g., the same antenna 1462 may be shared by the RATs). Network node 1460 may also include multiple sets of the various illustrated components for different wireless technologies integrated into network node 1460, such as, for example, GSM, WCDMA, LTE, NR, WiFi, or Bluetooth wireless technologies. These wireless technologies may be integrated into the same or different chip or set of chips and other components within network node 1460.

Processing circuitry 1470 is configured to perform any determining, calculating, or similar operations (e.g., certain obtaining operations) described herein as being provided by a network node. These operations performed by processing circuitry 1470 may include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 may execute instructions stored in device readable medium 1480 or in memory within processing circuitry 1470. Such functionality may include providing any of the various wireless features, functions, or benefits discussed herein. In some embodiments, processing circuitry 1470 may include a system on a chip (SOC).

In some embodiments, processing circuitry 1470 may include one or more of radio frequency (RF) transceiver circuitry 1472 and baseband processing circuitry 1474. In some embodiments, radio frequency (RF) transceiver circuitry 1472 and baseband processing circuitry 1474 may be on separate chips (or sets of chips), boards, or units, such as radio units and digital units. In alternative embodiments, part or all of RF transceiver circuitry 1472 and baseband processing circuitry 1474 may be on the same chip or set of chips, boards, or units.

In certain embodiments, some or all of the functionality described herein as being provided by a network node, base station, eNB or other such network device may be performed by processing circuitry 1470 executing instructions stored on device readable medium 1480 or memory within processing circuitry 1470. In alternative embodiments, some or all of the functionality may be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1470. Device readable medium 1480 may store any suitable instructions, data or information, including a computer program, software, an application including one or more of logic, rules, code, tables, etc. and/or other instructions capable of being executed by processing circuitry 1470 and, utilized by network node 1460. Device readable medium 1480 may be used to store any calculations made by processing circuitry 1470 and/or any data received via interface 1490. In some embodiments, processing circuitry 1470 and device readable medium 1480 may be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that may be coupled to, or in certain embodiments a part of, antenna 1462. Radio front end circuitry 1492 comprises filters 1498 and amplifiers 1496. Radio front end circuitry 1492 may be connected to antenna 1462 and processing circuitry 1470. Radio front end circuitry may be configured to condition signals communicated between antenna 1462 and processing circuitry 1470. Radio front end circuitry 1492 may receive digital data that is to be sent out to other network nodes or WDs via a wireless connection. Radio front end circuitry 1492 may convert the digital data into a radio signal having the appropriate channel and bandwidth parameters using a combination of filters 1498 and/or amplifiers 1496. The radio signal may then be transmitted via antenna 1462. Similarly, when receiving data, antenna 1462 may collect radio signals which are then converted into digital data by radio front end circuitry 1492. The digital data may be passed to processing circuitry 1470. In other embodiments, the interface may comprise different components and/or different combinations of components.

In certain alternative embodiments, network node 1460 may not include separate radio front end circuitry 1492, instead, processing circuitry 1470 may comprise radio front end circuitry and may be connected to antenna 1462 without separate radio front end circuitry 1492. Similarly, in some embodiments, all or some of RF transceiver circuitry 1472 may be considered a part of interface 1490. In still other embodiments, interface 1490 may include one or more ports or terminals 1494, radio front end circuitry 1492, and RF transceiver circuitry 1472, as part of a radio unit (not shown), and interface 1490 may communicate with baseband processing circuitry 1474, which is part of a digital unit (not shown).

Antenna 1462 may include one or more antennas, or antenna arrays, configured to send and/or receive wireless signals. Antenna 1462 may be coupled to radio front end circuitry 1492 and may be any type of antenna capable of transmitting and receiving data and/or signals wirelessly. In some embodiments, antenna 1462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1462 may be separate from network node 1460 and may be connectable to network node 1460 through an interface or port.

Antenna 1462, interface 1490, and/or processing circuitry 1470 may be configured to perform any receiving operations and/or certain obtaining operations described herein as being performed by a network node. Any information, data and/or signals may be received from a wireless device, another network node and/or any other network equipment. Similarly, antenna 1462, interface 1490, and/or processing circuitry 1470 may be configured to perform any transmitting operations described herein as being performed by a network node. Any information, data and/or signals may be transmitted to a wireless device, another network node and/or any other network equipment.

Power circuitry 1487 may comprise, or be coupled to, power management circuitry and is configured to supply the components of network node 1460 with power for performing the functionality described herein. Power circuitry 1487 may receive power from power source 1486. Power source 1486 and/or power circuitry 1487 may be configured to provide power to the various components of network node 1460 in a form suitable for the respective components (e.g., at a voltage and current level needed for each respective component). Power source 1486 may either be included in, or external to, power circuitry 1487 and/or network node 1460. For example, network node 1460 may be connectable to an external power source (e.g., an electricity outlet) via an input circuitry or interface such as an electrical cable, whereby the external power source supplies power to power circuitry 1487. As a further example, power source 1486 may comprise a source of power in the form of a battery or battery pack which is connected to, or integrated in, power circuitry 1487. The battery may provide backup power should the external power source fail. Other types of power sources, such as photovoltaic devices, may also be used.

Alternative embodiments of network node 1460 may include additional components beyond those shown in FIG. 14 that may be responsible for providing certain aspects of the network node's functionality, including any of the functionality described herein and/or any functionality necessary to support the subject matter described herein. For example, network node 1460 may include user interface equipment to allow input of information into network node 1460 and to allow output of information from network node 1460. This may allow a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 may include multiple sets of one or more of the illustrated components for different wireless technologies supported by WD 1410, such as, for example, GSM, WCDMA, LTE, NR, WiFi, WiMAX, or Bluetooth wireless technologies, just to mention a few. These wireless technologies may be integrated into the same or different chips or set of chips as other components within WD 1410.

Antenna 1411 may include one or more antennas or antenna arrays, configured to send and/or receive wireless signals, and is connected to interface 1414. In certain alternative embodiments, antenna 1411 may be separate from WD 1410 and be connectable to WD 1410 through an interface or port. Antenna 1411, interface 1414, and/or processing circuitry 1420 may be configured to perform any receiving or transmitting operations described herein as being performed by a WD. Any information, data and/or signals may be received from a network node and/or another WD. In some embodiments, radio front end circuitry and/or antenna 1411 may be considered an interface.

As illustrated, interface 1414 comprises radio front end circuitry 1412 and antenna 1411. Radio front end circuitry 1412 comprise one or more filters 1418 and amplifiers 1416. Radio front end circuitry 1412 is connected to antenna 1411 and processing circuitry 1420, and is configured to condition signals communicated between antenna 1411 and processing circuitry 1420. Radio front end circuitry 1412 may be coupled to or a part of antenna 1411. In some embodiments, WD 1410 may not include separate radio front end circuitry 1412; rather, processing circuitry 1420 may comprise radio front end circuitry and may be connected to antenna 1411. Similarly, in some embodiments, some or all of RF transceiver circuitry 1422 may be considered a part of interface 1414. Radio front end circuitry 1412 may receive digital data that is to be sent out to other network nodes or WDs via a wireless connection. Radio front end circuitry 1412 may convert the digital data into a radio signal having the appropriate channel and bandwidth parameters using a combination of filters 1418 and/or amplifiers 1416. The radio signal may then be transmitted via antenna 1411. Similarly, when receiving data, antenna 1411 may collect radio signals which are then converted into digital data by radio front end circuitry 1412. The digital data may be passed to processing circuitry 1420. In other embodiments, the interface may comprise different components and/or different combinations of components.

Processing circuitry 1420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality may include providing any of the various wireless features or benefits discussed herein. For example, processing circuitry 1420 may execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry may comprise different components and/or different combinations of components. In certain embodiments processing circuitry 1420 of WD 1410 may comprise a SOC. In some embodiments, RF transceiver circuitry 1422, baseband processing circuitry 1424, and application processing circuitry 1426 may be on separate chips or sets of chips. In alternative embodiments, part or all of baseband processing circuitry 1424 and application processing circuitry 1426 may be combined into one chip or set of chips, and RF transceiver circuitry 1422 may be on a separate chip or set of chips. In still alternative embodiments, part or all of RF transceiver circuitry 1422 and baseband processing circuitry 1424 may be on the same chip or set of chips, and application processing circuitry 1426 may be on a separate chip or set of chips. In yet other alternative embodiments, part or all of RF transceiver circuitry 1422, baseband processing circuitry 1424, and application processing circuitry 1426 may be combined in the same chip or set of chips. In some embodiments, RF transceiver circuitry 1422 may be a part of interface 1414. RF transceiver circuitry 1422 may condition RF signals for processing circuitry 1420.

In certain embodiments, some or all of the functionality described herein as being performed by a WD may be provided by processing circuitry 1420 executing instructions stored on device readable medium 1430, which in certain embodiments may be a computer-readable storage medium. In alternative embodiments, some or all of the functionality may be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 may be configured to perform any determining, calculating, or similar operations (e.g., certain obtaining operations) described herein as being performed by a WD. These operations, as performed by processing circuitry 1420, may include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 may be operable to store a computer program, software, an application including one or more of logic, rules, code, tables, etc. and/or other instructions capable of being executed by processing circuitry 1420. Device readable medium 1430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1420. In some embodiments, processing circuitry 1420 and device readable medium 1430 may be considered to be integrated.

User interface equipment 1432 may provide components that allow for a human user to interact with WD 1410. Such interaction may be of many forms, such as visual, audial, tactile, etc. User interface equipment 1432 may be operable to produce output to the user and to allow the user to provide input to WD 1410. The type of interaction may vary depending on the type of user interface equipment 1432 installed in WD 1410. For example, if WD 1410 is a smart phone, the interaction may be via a touch screen; if WD 1410 is a smart meter, the interaction may be through a screen that provides usage (e.g., the number of gallons used) or a speaker that provides an audible alert (e.g., if smoke is detected). User interface equipment 1432 may include input interfaces, devices and circuits, and output interfaces, devices and circuits. User interface equipment 1432 is configured to allow input of information into WD 1410, and is connected to processing circuitry 1420 to allow processing circuitry 1420 to process the input information. User interface equipment 1432 may include, for example, a microphone, a proximity or other sensor, keys/buttons, a touch display, one or more cameras, a USB port, or other input circuitry. User interface equipment 1432 is also configured to allow output of information from WD 1410, and to allow processing circuitry 1420 to output information from WD 1410. User interface equipment 1432 may include, for example, a speaker, a display, vibrating circuitry, a USB port, a headphone interface, or other output circuitry. Using one or more input and output interfaces, devices, and circuits, of user interface equipment 1432, WD 1410 may communicate with end users and/or the wireless network, and allow them to benefit from the functionality described herein.

Auxiliary equipment 1434 is operable to provide more specific functionality which may not be generally performed by WDs. This may comprise specialized sensors for doing measurements for various purposes, interfaces for additional types of communication such as wired communications etc. The inclusion and type of components of auxiliary equipment 1434 may vary depending on the embodiment and/or scenario.

Power source 1436 may, in some embodiments, be in the form of a battery or battery pack. Other types of power sources, such as an external power source (e.g., an electricity outlet), photovoltaic devices or power cells, may also be used. WD 1410 may further comprise power circuitry 1437 for delivering power from power source 1436 to the various parts of WD 1410 which need power from power source 1436 to carry out any functionality described or indicated herein. Power circuitry 1437 may in certain embodiments comprise power management circuitry. Power circuitry 1437 may additionally or alternatively be operable to receive power from an external power source; in which case WD 1410 may be connectable to the external power source (such as an electricity outlet) via input circuitry or an interface such as an electrical power cable. Power circuitry 1437 may also in certain embodiments be operable to deliver power from an external power source to power source 1436. This may be, for example, for the charging of power source 1436. Power circuitry 1437 may perform any formatting, converting, or other modification to the power from power source 1436 to make the power suitable for the respective components of WD 1410 to which power is supplied.

Figure 15:
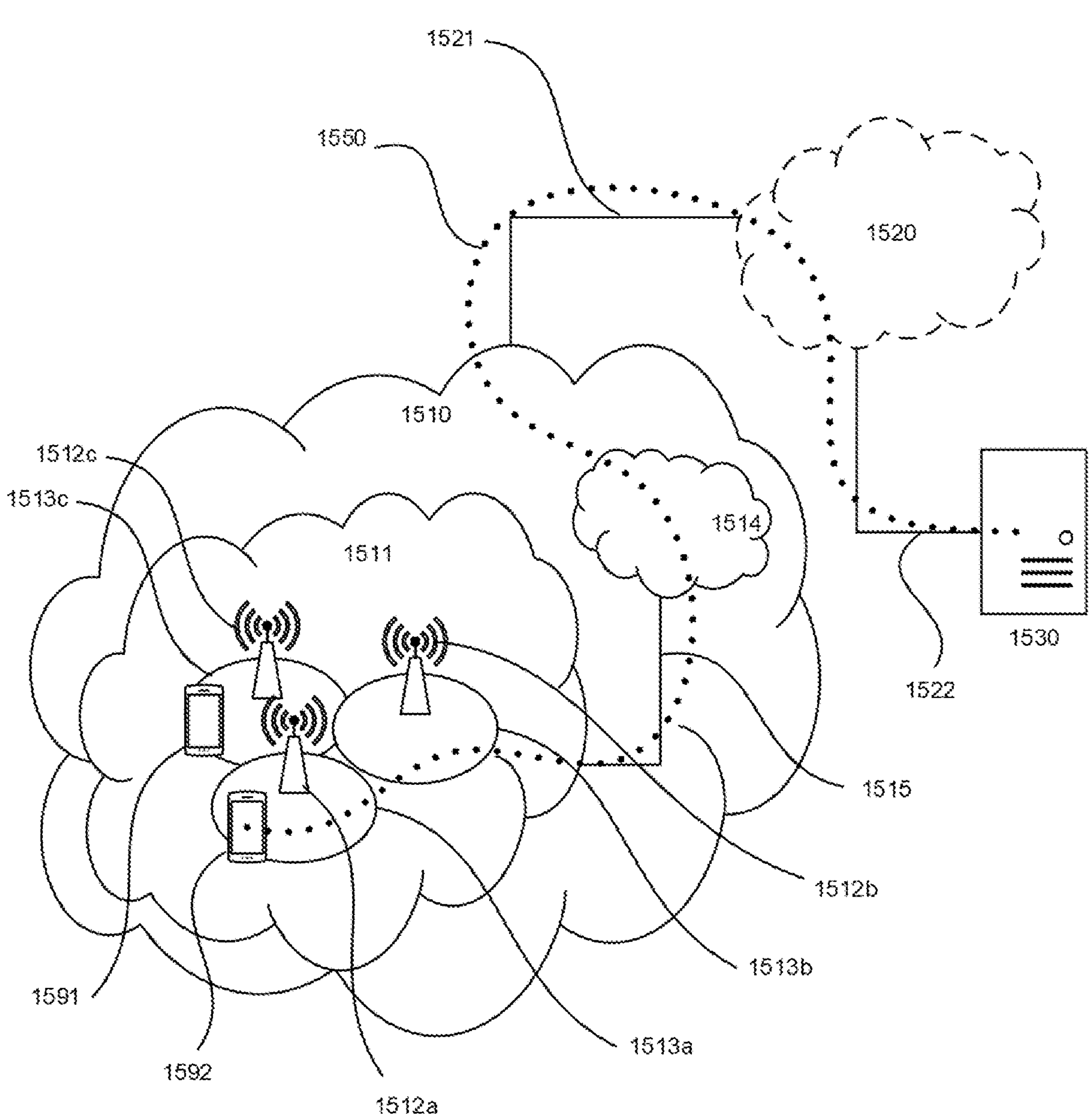
FIG. 15 shows a telecommunication network connected via an intermediate network to a host computer in accordance with some embodiments.

With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512*a*, 1512*b*, 1512*c*, such as NBs, eNBs, gNBs or other types of wireless access points, each defining a corresponding coverage area 1513*a*, 1513*b*, 1513*c*. Each base station 1512*a*, 1512*b*, 1512*c* is connectable to core network 1514 over a wired or wireless connection 1515. A first UE 1591 located in coverage area 1513*c* is configured to wirelessly connect to, or be paged by, the corresponding base station 1512*c*. A second UE 1592 in coverage area 1513*a* is wirelessly connectable to the corresponding base station 1512*a*. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

Figure 16:
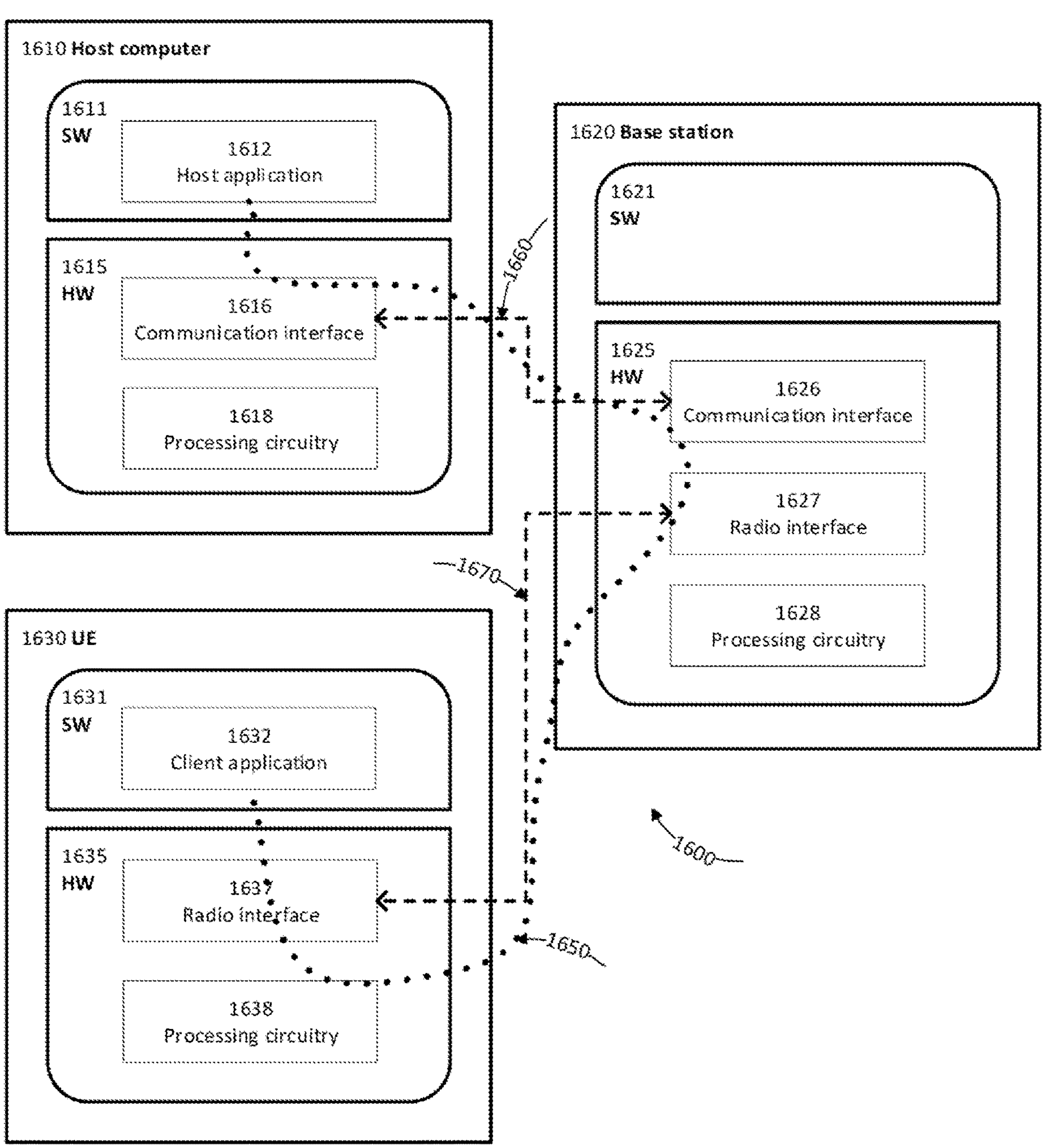
FIG. 16 shows a host computer communicating via a base station with a user equipment over a partially wireless connection in accordance with some embodiments.

It is noted that host computer 1610, base station 1620 and UE 1630 illustrated in FIG. 16 may be similar or identical to host computer 1530, one of base stations 1512*a*, 1512*b*, 1512*c* and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments may improve the performance of OTT services provided to UE 1630 using OTT connection 1650, in which wireless connection 1670 forms the last segment. For example, the teachings of these embodiments may improve network performance and/or improve QoS and/or reduce power consumption, and may thereby provide benefits such as improved user experience and/or extended battery lifetime.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figures 17, 18:
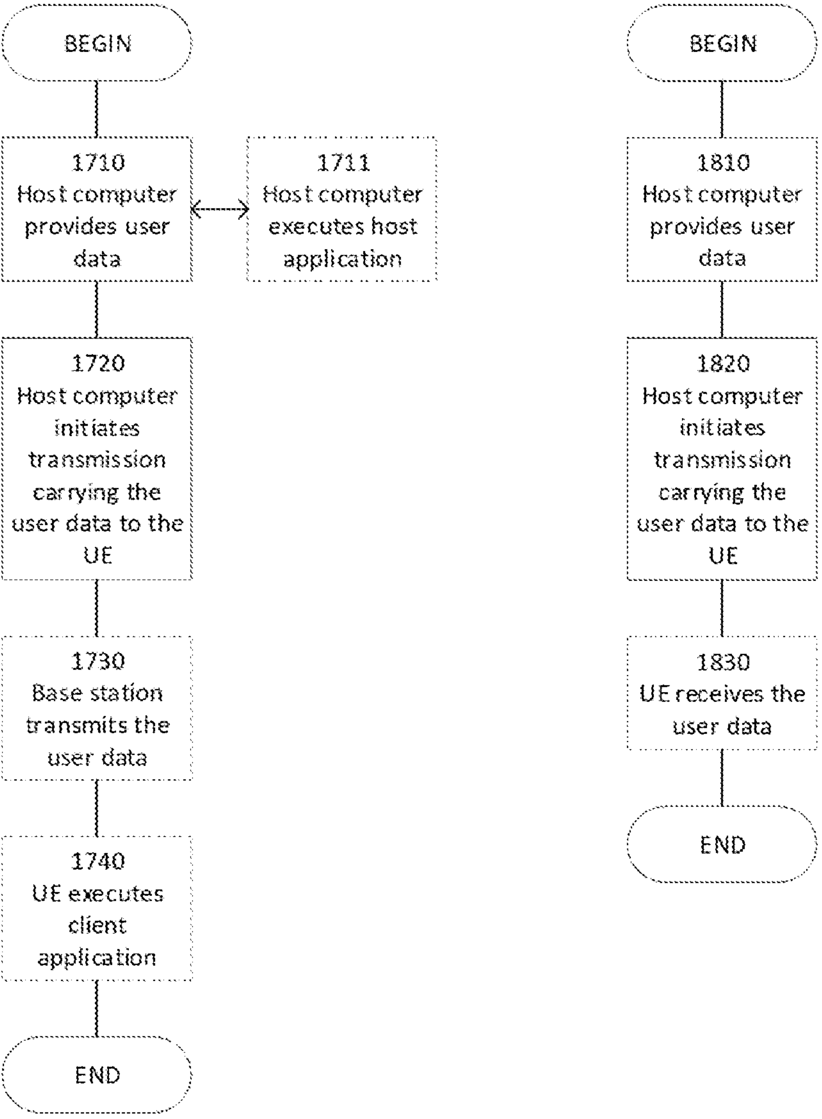
FIGS. 17-20 show methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figures 19, 20:
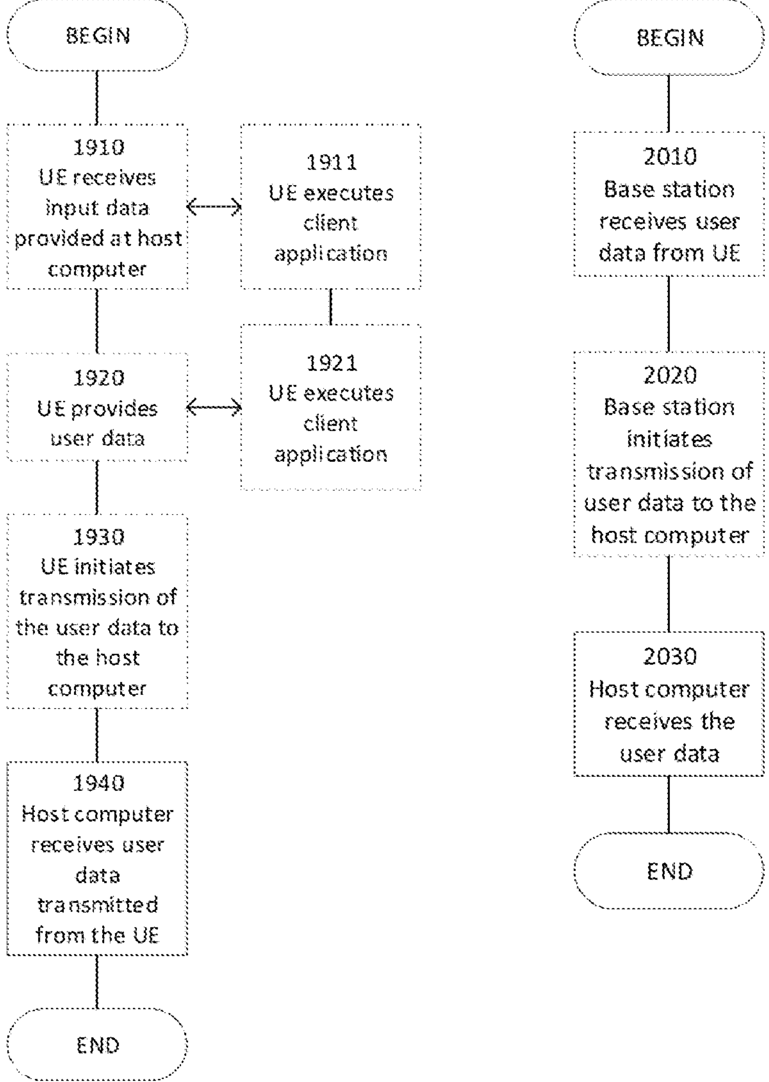

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

MISCELLANEOUS

The person skilled in the art realizes that the proposed approach presented in the present disclosure is by no means limited to the preferred embodiments described above. On the contrary, many modifications and variations are possible. Further, it will be appreciated that the WCD 1410 and the network node 1460 shown in FIG. 14 are merely intended as examples, and that other WCD and network nodes may also perform the methods described above with reference to FIGS. 3-13. It will also be appreciated that the method steps described with reference to FIGS. 3-13 need not necessarily be performed in the specific order shown in these figures, unless otherwise indicated.

Additionally, variations to the disclosed embodiments can be understood and effected by those skilled in the art. It will be appreciated that the word "comprising" does not exclude other elements or steps, and that the indefinite article "a" or "an" does not exclude a plurality. The word "or" is not to be interpreted as an exclusive or (sometimes referred to as "XOR"). On the contrary, expressions such as "A or B" covers all the cases "A and not B", "B and not A" and "A and B". The mere fact that certain measures are recited in mutually different dependent claims does not indicate that a combination of these measures cannot be used to advantage.

The invention claimed is:

1. A method performed by a wireless communication device configured for use in a wireless communication network, the method comprising:

transmitting one or more uplink transmissions to a network node in the wireless communication network that the wireless communication device is configured to use;

receiving one or more reflected versions of the one or more uplink transmissions;

performing measurements on the received one or more reflected versions of the one or more uplink transmissions to obtain backscattering measurements for the one or more uplink transmissions to the network node; and reporting, to the wireless communication network, the backscattering measurements for the one or more uplink transmissions to the network node.

2. The method of claim 1, wherein the backscattering measurements comprise one or more of:

a received power of the received one or more reflected versions of the one or more uplink transmissions;

ranging information indicative of a distance between the wireless communication device an object in a vicinity of the wireless communication device; and doppler shift of the received one or more reflected versions of the one or more uplink transmissions.

3. The method of claim 1, wherein the one or more uplink transmissions comprise one or more of:

a sounding reference signal;

a positioning reference signal; and a reference signal used during a random access channel, RACH, procedure.

4. The method of claim 1, further comprising:

receiving configuration of an uplink reference signal for positioning measurements, wherein the one or more uplink transmissions comprise the uplink reference signal.

5. The method of claim 1, further comprising:

receiving configuration of a downlink reference signal for positioning measurements;

obtaining positioning measurements for one or more downlink transmissions comprising the downlink reference signal; and reporting the positioning measurements to the wireless communication network.

6. The method of claim 5, wherein positioning measurements comprise one or more of:

a time of arrival measurement;

an angle of arrival measurement; and a reference signal received power measurement.

7. The method of claim 1, wherein the backscattering measurements for the one or more uplink transmissions are obtained using a different set of at least one antenna element or antenna panel than used for the transmission of the one or more uplink transmissions.

8. The method of claim 1, wherein a set of at least one antenna element or antenna panel is used for transmitting the one or more uplink transmissions and for obtaining the backscattering measurements.

9. The method of claim 1, wherein the wireless communication device reports the backscattering measurements to a location server in the wireless communication network.

10. A wireless communication device configured for use in a wireless communication network, the wireless communication device comprising processing circuitry and one or more memories, the one or more memories containing instructions executable by the processing circuitry to configure the wireless communication device to:

transmit one or more uplink transmissions to a network node in the wireless communication network that the wireless communication device is configured to use;

receive one or more reflected versions of the one or more uplink transmissions;

perform measurements on the received one or more reflected versions of the one or more uplink transmissions to obtain backscattering measurements for the one or more uplink transmissions to the network node; and report, to the wireless communication network, the backscattering measurements for the one or more uplink transmissions to the network node.

11. The wireless communication device of claim 10, wherein the one or more uplink transmissions comprise one or more of:

a sounding reference signal;

a positioning reference signal; and a reference signal used during a random access channel, RACH, procedure.

12. The wireless communication device of claim 10, wherein the one or more memories contain instructions executable by the processing circuitry to further configure the wireless communication device to:

receive configuration of an uplink reference signal for positioning measurements, wherein the one or more uplink transmissions comprise the uplink reference signal.

* * * * *